United States Patent
Choi et al.

(10) Patent No.: US 12,476,889 B2
(45) Date of Patent: Nov. 18, 2025

(54) KIOSK SETTING METHOD AND SYSTEM FOR CHEERING STICK PAIRING SERVICE

(71) Applicant: HYBE Co., Ltd., Seoul (KR)

(72) Inventors: Bo Yoon Choi, Seoul (KR); Sung Joo Jeong, Seoul (KR); Do Eun Gil, Seoul (KR)

(73) Assignee: HYBE CO., LTD., Seoul (KR)

(*) Notice: Subject to any disclaimer, the term of this patent is extended or adjusted under 35 U.S.C. 154(b) by 100 days.

(21) Appl. No.: 18/544,021

(22) Filed: Dec. 18, 2023

(65) Prior Publication Data
US 2024/0414074 A1  Dec. 12, 2024

(30) Foreign Application Priority Data
Jun. 7, 2023 (KR) .................. 10-2023-0072770

(51) Int. Cl.
*H04L 43/065* (2022.01)
*H04L 41/082* (2022.01)
*H04L 41/22* (2022.01)

(52) U.S. Cl.
CPC .......... *H04L 43/065* (2013.01); *H04L 41/082* (2013.01); *H04L 41/22* (2013.01)

(58) Field of Classification Search
CPC ..... H04L 43/065; H04L 41/082; H04L 41/22; H04L 67/141; H04L 67/34; G06Q 50/10; G06Q 10/02; A63J 5/02; G06F 9/4416; H04W 4/80; H04W 84/20
See application file for complete search history.

(56) References Cited

U.S. PATENT DOCUMENTS 10,880,975 B2 * 12/2020 Song .................. H05B 47/155

FOREIGN PATENT DOCUMENTS

| CN | 110618398 B | * | 9/2020 | ............. H04W 4/02 |
| EP | 4066913 B1 | * | 3/2024 | ........... H05B 47/155 |
| JP | 2023521921 A | * | 5/2023 | ......... H04N 21/2743 |
| JP | 2024006979 A | * | 1/2024 | ............. F16M 11/22 |
| KR | 20180016455 A | * | 2/2018 | ............. F21S 2/005 |
| KR | 10-2020-0019453 | | 2/2020 | |
| KR | 20200133316 A | * | 11/2020 | ......... H05B 47/1985 |
| KR | 102291414 B1 | * | 8/2021 | ............. H05B 47/19 |
| WO | WO-2018117329 A1 | * | 6/2018 | ............. G06Q 50/10 |

* cited by examiner

Primary Examiner — Philip C Lee
(74) Attorney, Agent, or Firm — KILE PARK REED & HOUTTEMAN PLLC

(57) ABSTRACT

A kiosk setting method for a cheering stick pairing service according to an embodiment of the present disclosure is performed by a processor of a mask kiosk to provide the cheering stick pairing service and includes: receiving and storing performance information for at least one performance including a first performance; providing a first kiosk setting interface for providing the cheering stick pairing service; providing a second kiosk setting interface for providing first performance preparation information for the first performance to a paired cheering stick; and transmitting the received performance information and setting information set through the first and second kiosk setting interfaces to at least one slave kiosk.

9 Claims, 13 Drawing Sheets

| Identification number | Light emitting pattern | | | |
|---|---|---|---|---|
| | Power | Color | Brightness | Effect |
| 1 | ON | (255,0,0) | 50 | Blink |
| 2 | OFF | - | - | - |
| 3 | ON | (0,0,255) | 10 | Grad |

1010: row 1
1020: row 2
1030: row 3

| Identification number | Library identification number | Duration |
|---|---|---|
| 001 | 0001 | 5sec |
| | 0002 | 3sec |
| | 0003 | 2sec |
| 002 | 0005 | 8sec |
| | 0001 | 30sec |
| | 0004 | 14sec |

1100: first group (001)
1100: second group (002)

FIG. 13

KIOSK SETTING METHOD AND SYSTEM FOR CHEERING STICK PAIRING SERVICE

TECHNICAL FIELD

The present disclosure relates to a kiosk setting method and system for a cheering stick pairing service. More specifically, the present disclosure relates to a kiosk setting method and system for managing a cheering stick pairing service performed at a plurality of kiosks installed in a concert hall.

BACKGROUND

In order to produce a performance using a cheering stick, each user may download a library in advance that presets the light emission of the cheering stick according to the signature color or song rhythm of a team or artist to cheer and apply the same to the cheering stick.

In order to store such a library in the cheering stick before the performance, a pairing service was launched according to the related art to deliver the library to the cheering stick carried by each user at a performance venue.

However, in order to provide the pairing service, a manager needs to individually store performance-related information in each of a plurality of kiosks installed in a concert hall. When changes in performance-related information occur, time/procedural/human inefficiencies resulted from having to update each kiosk manually and individually.

In addition, the plurality of kiosks installed in a concert hall operate individually and there is no central management device to control the same. As a result, the operation status of all kiosks may not be monitored in real time, and there is an issue in that each kiosk may not immediately respond to issues that may arise unexpectedly.

Moreover, even when trying to collect information about pairing performed at each kiosk after the end of the performance, even when it is not in real time, there is an inconvenience of having to extract information from each kiosk and collect the same manually. Therefore, there is an urgent need to invent technology to address this issue.

RELATED ART DOCUMENT

Patent Document (Patent Document 1) KR 10-2018-0094996 A

SUMMARY

The present disclosure is directed to addressing an issue associated with the related art, and to providing a kiosk setting method and system for a cheering stick pairing service that provides a central management device capable of integrated control of a plurality of kiosks regardless of network environment In addition, an aspect of the present disclosure is directed to providing a kiosk setting method and system for a cheering stick pairing service that monitors the operation status of all connected kiosks in real time.

In addition, an aspect of the present disclosure is directed to providing a kiosk setting method and system for a cheering stick pairing service that collects pairing information and generates statistical data.

However, technical tasks to be achieved by the present embodiment are not limited to the technical tasks described above, and there may be other technical tasks.

The kiosk setting method for a cheering stick pairing service according to an embodiment of the present disclosure is performed by a processor of a master kiosk for providing the cheering stick pairing service, and includes: receiving and storing performance information for at least one performance including a first performance; providing a first kiosk setting interface for providing the cheering stick pairing service; providing a second kiosk setting interface for providing first performance preparation information for the first performance to a paired cheering stick; and transmitting the received performance information and setting information set through the first and second kiosk setting interfaces to at least one slave kiosk.

The kiosk setting method for a cheering stick pairing service according to an embodiment of the present disclosure is performed by a processor of the slave kiosk for providing the cheering stick pairing service, and further includes: detecting new performance information from setting information received from a master kiosk; updating the detected new performance information; and providing the cheering stick pairing service based on the updated new performance information.

The kiosk setting system for a cheering stick pairing service according to an embodiment of the present disclosure includes: a performance management server; at least one slave kiosk; and at least one master kiosk connected to the at least one slave kiosk and including at least one memory and at least one processor, wherein at least one kiosk setting program stored in the memory of the master kiosk and executed by the processor to provide a kiosk setting program: receives and stores performance information for at least one performance including a first performance; provides a first kiosk setting interface for providing the cheering stick pairing service; provides a second kiosk setting interface for providing first performance preparation information for the first performance to a paired cheering stick; and transmits the received performance information and setting information set through the first and second kiosk setting interfaces to at least one slave kiosk.

The kiosk setting method and system for a cheering stick pairing service according to an embodiment of the present disclosure provides a central management device capable of integrated control of a plurality of kiosks regardless of the network environment, and thus can utilize the cheering stick pairing service even in areas with poor network environments, thereby resolving regional limitations in terms of performance venue and responding quickly to changes in performance information, and eliminating inconvenience caused by errors and change issues.

In addition, the kiosk setting method and system for a cheering stick pairing service according to an embodiment of the present disclosure monitors the operation status of all connected kiosks in real time, thereby enabling immediate response to stop or encourage the use of kiosks with relatively excessive or too little pairing, and maximizing time and procedural efficiency in providing pairing services by distributing the number of kiosk users.

In addition, the kiosk setting method and system for a cheering stick pairing service according to an embodiment of the present disclosure collects pairing information and generates statistical data, thereby reducing the time, procedural, and human waste required for information collection and providing rapid decision-making support for performances.

However, the benefits of the present disclosure are not limited to those mentioned above, and other benefits not mentioned may be clearly understood by those skilled in the art from the following description.

BRIEF DESCRIPTION OF THE DRAWINGS

FIG. 3A and FIG. 3B are diagrams explaining information included in cheering data according to an embodiment of the present disclosure.

FIG. 13 is a diagram showing an example of a user UI through which a cheering stick pairing service is provided according to an embodiment of the present disclosure.

DETAILED DESCRIPTION

Since the present disclosure may be modified in various ways and may provide various embodiments, specific embodiments will be depicted in the appended drawings and described in detail with reference to the drawings. The effects and characteristics of the present disclosure and a method for achieving them will be clearly understood by referring to the embodiments described later in detail together with the appended drawings. However, it should be noted that the present disclosure is not limited to the embodiment disclosed below but may be implemented in various forms. In the following embodiments, the terms such as first and second are introduced to distinguish one element from the others, and thus the technical scope of the present disclosure should not be limited by those terms. In addition, a singular expression should be understood to indicate a plural expression unless otherwise explicitly stated. The term "include" or "have" is used to indicate existence of an embodied feature or constituting element in the present specification; and should not be understood to preclude the possibility of adding one or more other features or constituting elements. In addition, constituting elements in the figure may be exaggerated or shrunk for the convenience of descriptions. For example, since the size and thickness of each element in the figure has been arbitrarily modified for the convenience of descriptions, it should be noted that the present disclosure is not necessarily limited to what has been shown in the figure.

Hereinafter, embodiments of the present disclosure will be described in detail with reference to appended drawings. Throughout the specification, the same or corresponding constituting element is assigned the same reference number, and repeated descriptions thereof will be omitted.

Figure 1:
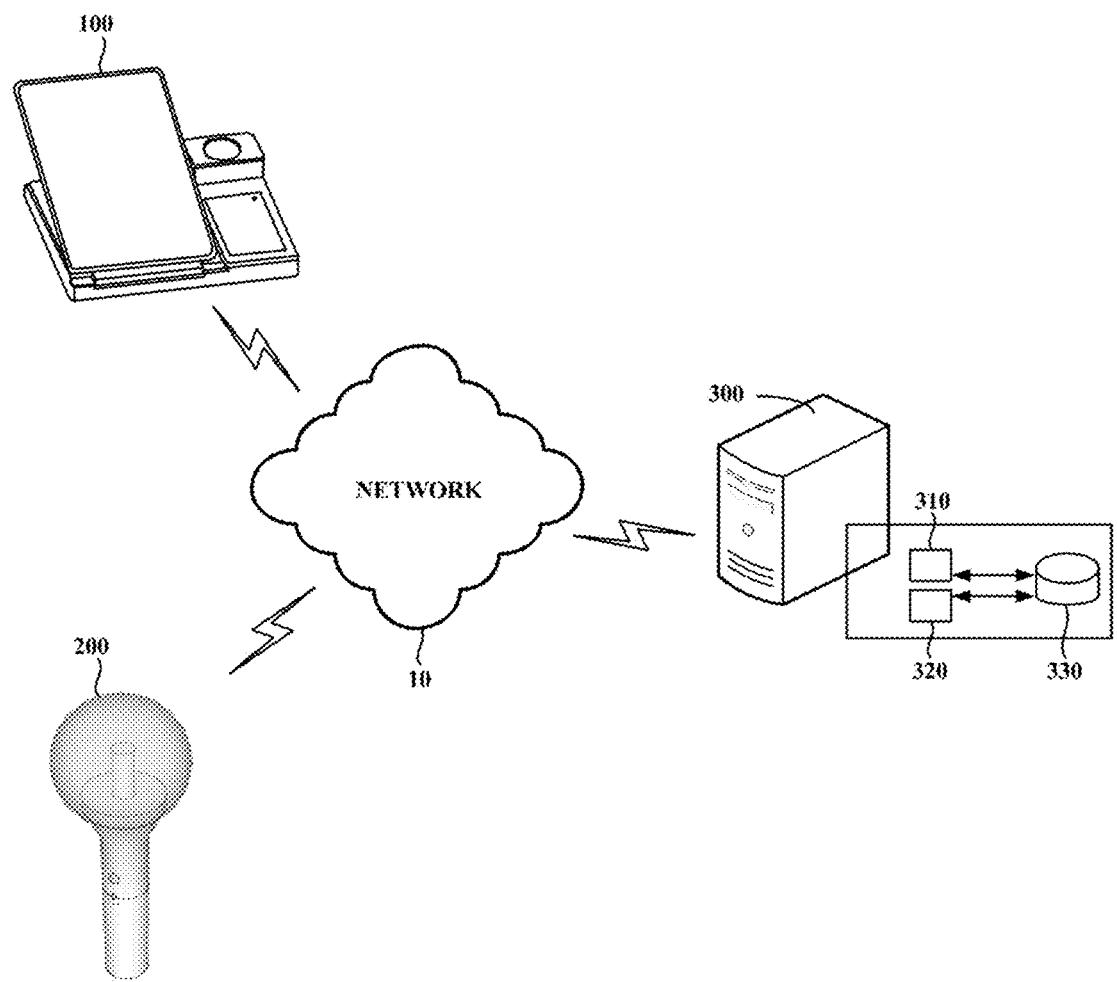
FIG. 1 is a conceptual diagram of a kiosk setting system according to an embodiment of the present disclosure.

FIG. 1 is a conceptual diagram of a kiosk setting system according to an embodiment of the present disclosure.

Referring to FIG. 1, the kiosk setting system for a cheering stick pairing service (hereinafter referred to as "kiosk setting system") according to an embodiment of the present disclosure may provide a kiosk setting service to manage the cheering stick pairing service performed at a plurality of kiosks installed in a concert hall (hereinafter referred to as "kiosk setting service").

In an embodiment, the cheering stick pairing service may mean a service that connects and transmits a seat library for operating a plurality of cheering sticks in a unified direction with a light emission pattern in a concert hall from a kiosk to a cheering stick through short-distance communication.

In addition, in an embodiment, the seat library may be stored in advance using a kiosk or the like before the start of a performance. Each cheering stick is placed in a different seat, and thus may be stored differently depending on the seat.

In other words, in an embodiment, the kiosk setting system may be a system that provides a service for setting information that needs to be stored and set in advance to provide the cheering stick pairing service to a plurality of kiosks that will provide the cheering stick pairing service.

In this connection, in an embodiment, the kiosk setting system may provide the kiosk setting service in which a master kiosk sets predetermined information to provide the cheering stick pairing service to a plurality of slave kiosks.

This kiosk setting system may provide at least one of the following services: performance preparation information management, connection server management, device settings management, pop-up management, pairing statistics, firmware management, or preset functions.

In an embodiment, the kiosk setting system implementing the aforementioned kiosk setting service may be connected through a kiosk 100, a cheering stick 200, a performance preparation server 300, a user terminal 400, and a network 10.

Herein, the network 10 according to an embodiment refers to a connection structure in which individual nodes such as the kiosk 100, the cheering stick 200, the performance preparation server 300, and/or the user terminal 400 may exchange information with each other; one example of the network 10 may include a 3rd Generation Partnership Project (3GPP) network, a Long Term Evolution (LTE) network, a World Interoperability for Microwave Access (WiMAX) network, the Internet, a Local Area Network (LAN), a Wireless Local Area Network (LAN), a Wide Area Network (WAN), a Personal Area Network (PAN), a Bluetooth network, a satellite broadcasting network, an analog broadcasting network, and a Digital Multimedia Broadcasting (DMB) network but is not limited thereto.

Hereinafter, the kiosk 100, the cheering stick 200, the performance preparation server 300, and the user terminal 400 implementing the kiosk setting system will be described in detail with reference to appended drawings.

Kiosk 100

The kiosk 100 according to an embodiment of the present disclosure may be a predetermined computing device providing a kiosk setting service and/or a cheering stick paring service.

The predetermined computing device providing the kiosk setting service and the cheering stick paring service according to an embodiment of the present disclosure is described based on the assumption that the device is implemented by the kiosk 100, but it is also possible to implement the device using a mobile-type computing device (for example, tablets and smartphones) and/or a desktop-type computing device (for example, PCs) and peripheral devices linked thereto.

In addition, the kiosk according to an embodiment of the present disclosure may include a master kiosk and/or a slave kiosk.

Herein, the master kiosk according to an embodiment may be a kiosk that controls other devices and processes including one or more slave kiosks and acts as a communication hub. In addition, the slave kiosk according to an embodiment may be a kiosk that provides a cheering stick pairing service under the control of the master kiosk.

In an embodiment, a kiosk setting program and/or a cheering stick pairing program for controlling at least one slave kiosk may be stored in the master kiosk, and a cheering stick pairing program may be stored in the slave kiosk.

Accordingly, the master kiosk may provide a kiosk pairing service, and the slave kiosk may provide a cheering stick pairing service under the control of the master kiosk.

Hereinafter, for convenience of explanation, the description will be made on the basis that the kiosk 100 is a master kiosk, and if necessary, the master kiosk and/or slave kiosk may be separately described.

In addition, according to an embodiment, the kiosk 100 may further include a predetermined server computing device that provides a kiosk pairing service environment.

Figure 2:
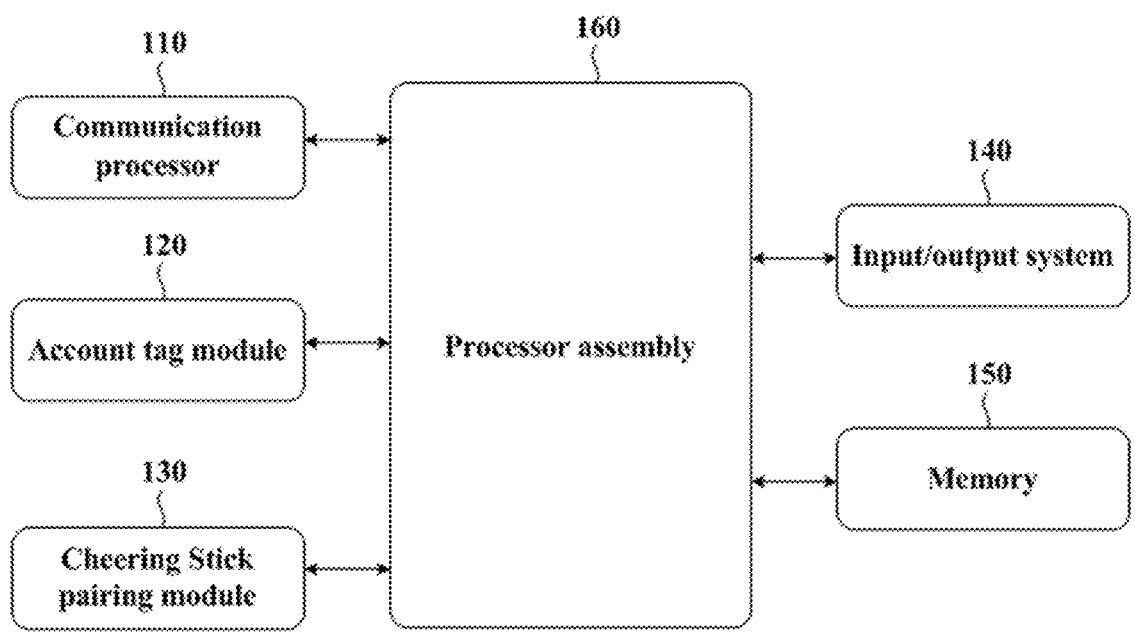
FIG. 2 is an internal block diagram of a kiosk according to an embodiment of the present disclosure.

FIG. 2 is an internal block diagram of a kiosk according to an embodiment of the present disclosure.

Referring to FIG. 2, from a functional point of view, the kiosk 100 may include a communication processor 110, an account tag module 120, a cheering stick pairing module 130, an input/output system 140, a memory 150, and a processor assembly 160.

In this connection, the kiosk 100 according to an embodiment may be implemented as an online type and/or an offline type depending on whether the communication processor 110 is included.

In detail, in an embodiment, when the kiosk 100 is implemented as an online type, real-time communication with the performance management server 300 is possible and predetermined information may be transmitted and received.

In this connection, in an embodiment, the kiosk 100 may use a first communication method in which only the master kiosk communicates with the performance management server 300 to receive predetermined information and transmits the received predetermined information to at least one slave kiosk.

In addition, in an embodiment, the kiosk 100 may use a second communication method in which the master kiosk simply performs a hotspot function, and the master kiosk and/or at least one slave kiosk communicates with the performance management server 300 to transmit and receive predetermined information.

In addition, in another embodiment, when the kiosk 100 is implemented as an offline type, the master kiosk may acquire and pre-store the latest performance information in advance from the performance management server 300 in a situation where the Internet environment is stable, and may transmit the pre-stored performance information to at least one slave kiosk without electrical communication with the performance management server 300 in areas where the Internet environment is unstable.

In this connection, the master kiosk, as an AP, may form an independent wireless network with each slave kiosk and transmit predetermined information.

The communication processor 110 may include one or more devices for communicating with an external device. The communication processor 110 may communicate through a wireless or wired network with the external device.

Specifically, the communication processor 110 may communicate with the performance management server 300 that stores a content source for providing a kiosk setting service and/or a cheering stick pairing service and communicate with various user input components, such as a controller that receives a user input.

In an embodiment, the communication processor 110 may transmit and receive various data related to the kiosk setting service and/or the cheering stick pairing service to and from another terminal and/or an external server.

The communication processor 110 may transmit and receive data wirelessly to and from at least one of a base station, an external terminal, and an arbitrary server on a mobile communication network built through a communication device capable of performing technology standards or communication methods (for example, Long Term Evolution (LTE), Long Term Evolution-Advanced (LTE-A), 5G New Radio (NR), and WiFi) for mobile communication; or communicate through a wired connection.

Specifically, the communication processor 110 according to an embodiment may receive performance preparation information including a seat library and performance-related detailed information from the performance management server 300 in real time.

In other words, when the kiosk 100 including the communication processor 110 is implemented as an online-type, changing performance information is acquired in real time, so that by immediately responding to sudden performance information changes, users who receive the cheering stick pairing service of the slave kiosk may stably acquire the latest information.

The account tag module 120 may include a first short-distance communication processor for detecting a tagged device. Herein, tagging may mean that a predetermined device approaches the account tag module 120 within a predetermined distance.

In this connection, the tagged device may be an account authentication device that includes account-related information of a user who owns the cheering stick 200 within a platform that produces the performance of the cheering stick 200. This account authentication device may perform the function of authenticating a user account to the kiosk 100, a ticket authentication device, a goods sales device, etc. through remote communication.

In detail, the account tag module 120 may detect whether a tagged device is approached, and upon detection, communicates with the device using short-distance communication to acquire information stored in the device.

For example, the account tag module 120 may include a communication chip that performs short-distance communication through Radio Frequency Identification (RFID), Near Field Communication (NFC), Magnetic Secure Transmission (MST), Near Field Magnetic Induction (NFMI), or Bluetooth communication.

In an embodiment, the account tag module 120 may be an NFC reader (for example, NFC tag pad) that performs an NFC function.

In addition, the account tag module 120 may transmit and receive various data related to the cheering stick pairing service to and from an external device based on the NFC function.

The account tag module 120 may transmit and receive data to and from an external device based on media employing a communication protocol defined in the ISO/IEC 18092 (or ECMA-340 or NFCIC-1) and the ISO/IEC 21481 (or ECMA-352 or NFCIC-2), which are the NFC international commercial specifications, specifically, based on the ISO/IEC 14443 (proximity card), the ISO/IEC 15693 (vicinity card), JIS: X6319 (FeliCa), or MIFARE.

In an embodiment, when recognizing that the account authentication device is located within a predetermined distance, the account tag module 120 may acquire user account information by performing short-distance communication with the account authentication device.

The cheering stick pairing module 130 may include a second short-distance communication processor for detecting a tagged device.

Specifically, the cheering stick pairing module 130 detects whether a tagged, mounted, or settled device (in an embodiment, the cheering stick 200) approaches and communicates with the device upon detection of the approach to transmit and receive data.

For example, the cheering stick pairing module 130 may include a communication chip that performs short-distance communication through, for example, Radio Frequency Identification (RFID), Near Field Communication (NFC), Magnetic Secure Transmission (MST), Near Field Magnetic Induction, or Bluetooth communication.

In addition, the cheering stick pairing module 130 may transmit and receive various data related to the cheering stick pairing service to and from an external device based on short-distance communication.

In an embodiment, when recognizing that the cheering stick 200 is located within a predetermined distance, the cheering stick pairing module 130 performs short-distance communication with the cheering stick 200 to transmit and receive various data for receiving a seat-library.

In the hardware structure, the cheering stick pairing module 130 may include a predetermined supporting member to securely fix the cheering stick 200 located within a predetermined distance.

For example, a predetermined supporting member may be implemented in a pedestal type that mounts the cheering stick 200, a pad type on which the cheering stick 200 is placed, or a box type having an internal space for accommodating the cheering stick 200.

The input/output system 140 may include a sensor system, an input system, and a display system.

The sensor system may include at least one of an image sensor, a position sensor, an audio sensor, a distance sensor, a proximity sensor, and a contact sensor.

Herein, the image sensor 141 may capture an image and/or a video of the surrounding physical space of the kiosk 100.

In an embodiment, the image sensor 141 may acquire an image related to the cheering stick pairing service (for example, a ticket image).

In addition, the image sensor 141 is disposed on the front or/and rear surface of the kiosk 100 to obtain an image by photographing a scene in the disposed direction, and a camera disposed toward the outside of the kiosk 100 may photograph a paper-type ticket.

The image sensor 141 may include an image sensor device and an image processing module. Specifically, the image sensor 141 may process a still image or a moving image obtained by the image sensor device (for example, CMOS or CCD).

In addition, the image sensor 141 may extract necessary information by processing a still image or a moving image obtained through the image sensor device using the image processing module (for example, an OCR device) and send the extracted information to the processor.

The image sensor 141 may be a camera assembly including at least one or more cameras.

In addition, depending on embodiments, the image sensor 141 may operate by being included in the kiosk or may operate in conjunction with the communication processor 110 by being included in an external device (for example, an external server).

The audio sensor may recognize a sound around the kiosk 100.

Specifically, the audio sensor may include a microphone capable of recognizing a voice input of a user who uses the kiosk 100.

In an embodiment, the audio sensor may receive voice data required for the cheering stick pairing service from a user.

In an embodiment, the kiosk 100 may include a speaker to output voice data input through the audio sensor.

The input system may sense a user input related the cheering stick pairing service (for example, a gesture, a voice command, a button operation, or other types of inputs).

Specifically, the input system may include a predetermined button, a touch sensor, and/or an image sensor 141 for receiving a user motion input.

In addition, the input system may be connected to an external controller to receive a user input.

The display system may output various pieces of information related to the cheering stick pairing service as a graphic image and sense a touch input of a user for library pairing.

In an embodiment, the display system may display a user interface (UI), library pairing content, and/or content management system (CMS: Content Management System) based data.

The display system may include at least one of a liquid crystal display (LCD), a thin film transistor-liquid crystal display (TFT LCD), an organic light-emitting diode (OLED), a flexible display, a three-dimensional (3D) display, and an e-ink display.

The constituting elements above may be disposed within the housing of the kiosk 100, and the user interface may include a touch sensor 145 on the display 143 configured to receive a user touch input.

Specifically, the display system may include a display 143 that outputs an image and a touch sensor 145 that detects a touch input of a user.

For example, the display 143 may be implemented as a touch screen by forming a layer structure or by being integrated with the touch sensor 145. The touch screen may not only function as a user input unit providing an input interface between the kiosk 100 and the user but also provide an output interface between the kiosk 100 and the user.

The memory 150 may store one or more of various application programs, data, and commands for providing the kiosk setting service and/or cheering sick pairing service environment.

In an embodiment, the memory 150 may store an application including a command for controlling the kiosk 100.

In addition, the memory 150 may include a program area and a data area.

Herein, the program area according to the embodiment may be linked between an operating system (OS) for booting the kiosk 100 and functional elements, and the data area may store data generated according to the use of the kiosk 100.

In addition, the memory 150 may include at least one or more non-volatile computer-readable storage media and volatile computer-readable storage media.

For example, the memory 150 may be one of various storage devices, such as a ROM, an EPROM, a flash drive, and a hard drive; and may include a web storage performing a storage function of the memory 150 on the Internet.

In an embodiment, the memory 150 may pre-store information necessary to perform the kiosk setting service and/or cheering stick paring service.

Specifically, in an embodiment, the memory 150 may pre-store access server management information to perform the kiosk setting service, information about managing device settings; pop-up management information, pairing statistical information, firmware management information and/or preset information; performance preparation information including performance name, artist name, performance time, performance location, and cheering data (details, seat library) to perform the cheering stick pairing service, user account information, and ticket reservation information and/or seating information.

The cheering data refers to data that pre-defines various light emission patterns that the cheering stick 200 needs to emit light at the seat where the cheering stick 200 will be located in order to produce a unified performance before the performance.

This cheering data is data that the cheering stick 200 needs to pre-store before the start of the performance. Each cheering stick 200 is placed in different seats, and thus may be stored differently depending on seat information.

Hereinafter, the cheering data corresponding to one seat where the cheering stick 200 will be placed will be described as a seat library.

In addition, in an embodiment, the cheering data may include a light emission pattern, library, and scenario.

FIG. 3A and FIG. 3B are diagrams explaining information included in cheering data according to an embodiment of the present disclosure.

Referring to FIG. 3A, the cheering data 1000 according to an embodiment may include a plurality of libraries 1010 to 1030.

The light emitting pattern refers to a light emission form in which a cheering stick 200 operates according to constituting elements including the light turning-on/off state (for example, On/Off), color, and brightness.

The light emitting pattern may also include a light emission effect obtained by setting the constituting elements to change within a predetermined time and generating a dynamic visual effect as a constituting element.

For example, the light emission effect may include 1) a blink effect obtained by setting light emission within a predetermined time differently for each time period and quickly flashing the cheering stick, 2) a gradation effect obtained by setting a light color within a predetermined time differently for each time period and gradually changing the emitted light color, and 3) a fade in/out effect obtained by setting the brightness differently for each time period and gradually decreasing or increasing the brightness.

The library refers to the data preconfiguring the light emitting pattern of the cheering stick 200 and may include an identification number and constituting element setting values (hereinafter, light emitting pattern setting values) for a light emitting pattern.

For example, the color included in the light emitting pattern setting value may be set by a hexadecimal code representing an RGB color, and the brightness included in the light emitting pattern setting value may be set by a brightness value ranging from 0 to 100, where the higher the brightness value, the brighter the emitted light.

For example, a first library 1010 may mean data set with an identification number 0001 for identifying the first library 1010, light emission ON, a first color, first brightness, and a first light emission effect.

Referring to the example shown in FIG. 3A, the first library 1010 may be a binary array indicating a light emitting pattern setting value of (0001/ON/255, 0, 0/50, Blink). In addition, a third library 1030 may be a binary array indicating a light emitting pattern setting value of (0003/ON/0, 0, 255/10/Grad). Meanwhile, since the light emission is OFF for the case of a second library 1020, the light emitting pattern setting values corresponding to color, brightness, and light emission effect may not be set.

In other words, when a control signal to execute the first library 1010 is sent to the cheering stick 200 storing a plurality of libraries 1010 to 1030 in an auditorium, the cheering stick 200 may emit light with a first light emission effect comprising a first color, which is red corresponding to 255, 0, 0, first brightness corresponding to the level of 50, and a first light emission effect, which is a blink effect corresponding to twinkling light.

The scenario is the data for setting the operation time (hereinafter, a library setting value) of at least one or more libraries for a predetermined time and operating the cheering stick 200 by changing the light emitting pattern of the cheering stick 200 for a pre-configured time, where the data may include a scenario identification number for identifying each scenario.

The scenario may correspond to, for example, a single song. In other words, the operation time of one scenario is the same as the playback time of one song, so that while the song is played, the cheering stick 100 may operate by changing the light emitting pattern according to the library setting value.

For example, a first scenario 1100 may be the data defined to have an identification number 001 and operate as a first library for 5 seconds, then operate as a second library for 3 seconds, and then operate as a third library for 2 seconds.

Referring to FIG. 3B, the cheering data 1000 according to an embodiment may include a plurality of scenarios 1100 and 1200.

Specifically, referring to the example shown in FIG. 3B, the first scenario 1100 may include a library setting value of (001, 0001-5 sec/0002-3 sec/0003-2 sec). In addition, the second scenario 1200 may include a library setting value of (002, 0005-8 sec/0002-30 sec/0003-14 sec).

In other words, when a control signal with a low amount of data instructing to operate the first scenario 1100 in an auditorium is sent to the cheering stick 200 storing a plurality of scenarios 1100, 1200, the cheering stick 200 may operate using a first light emitting pattern according to the first library 1010 for 5 seconds, using a second light emitting pattern according to the second library 1020 for 3 seconds, and using a third light emitting pattern according to the third library 1030 for 2 seconds.

Since the libraries and the scenarios have the same identification numbers but have different light emitting pattern setting values and library setting values for the seats where cheering sticks 200 are to be placed, the cheering sticks 200 may emit light differently according to their setting values.

Specifically, for example, although the first cheering stick disposed on the first seat and the second cheering stick disposed on the second seat may store the first library 1010 having the same identification number 0001, the light emitting pattern setting values set in the first library 1010 may be different from each other.

For example, the first library may include a first seat-first library which is a first library for the first seat, and a second seat-first library to an n-th seat-first library.

In this connection, the first seat-first library to the nth seat-first library may be defined to have the respective light emission setting values so that the cheering sticks arranged in the first to n-th seats exhibit a specific shape when viewed as a whole and fulfill a unified performance direction. Accordingly, as long as a performance director directs to operate the first library, the cheering stick at each seat may read the first library stored in the corresponding seat and operate according to the light emitting pattern setting value, thereby performing a unified performance direction.

In the same way, although the first cheering stick disposed on the first seat and the second cheering stick disposed on the second seat may store the first scenario 1100 having the same identification number 001, the library setting values set in the first scenario 1100 may be different from each other.

In other words, by controlling the cheering sticks 200 disposed at the respective seats to operate simultaneously but emit light in different light emitting patterns using the first library and the first scenario having different setting values for the respective seats, the performance manager may fulfill a performance direction such that the cheering sticks may exhibit a specific shape or pattern when viewed from a location away from the audience.

Returning again, the cheering data may be mapped to each seat to produce a different light emitting pattern for each seat and stored in the memory 150 including a seat library to meet the number of seats. In other words, each seat and cheering data may be implemented in the form of a mapping table; however, the present disclosure is not limited to the specific table form. Depending on the embodiments, the performance preparation data may be generated by grouping the seats to be operated according to a common light emitting pattern and defining a light emission setting value for each group.

Accordingly, the cheering stick 200 has to store in advance the cheering data (in other words, seat library) corresponding to each seat to be disposed when a performance is played, and the kiosk 100 may guide the process to users by providing the cheering stick pairing service. More details on the operation above will be provided later.

The kiosk 100 including the memory 150 for storing the aforementioned plurality of pieces of data for performing the cheering stick pairing service may be implemented as an offline type. Since the offline type master kiosk and/or slave kiosk pre-stores and maintains information related to the performance, it is possible to reduce the cost of building a communication function of the kiosk 100 and install the kiosk 100 in such a place where the communication infrastructure is not readily available; therefore, it has the effect of expanding the area where the kiosk may be used.

The processor assembly 160 may include at least one or more processors capable of executing instructions of an application stored in the memory 150 to perform various tasks for creating the kiosk setting service and/or cheering stick pairing service environment.

In an embodiment, the processor assembly 160 may control the overall operation of the constituting elements through the application of the memory 150 to provide the kiosk setting service and/or cheering stick pairing service.

The processor assembly 160 may be a system-on-a-chip (SOC) suitable for the kiosk 100, including a central processing unit (CPU) and/or a graphics processing unit (GPU), may execute the operating system (OS) and/or an application program stored in the memory 150, and control the individual constituting elements installed in the kiosk 100.

In addition, the processor assembly 160 may communicate with each constituting element internally through a system bus and may include one or more predetermined bus structures including a local bus.

In addition, the processor assembly 160 may be implemented by using at least one of application-specific integrated circuits (ASICs), digital signal processors (DSPs), digital signal processing devices (DSPDs), programmable logic devices (PLDs), field programmable gate arrays (FPGAs), controllers, micro-controllers, microprocessors, and electric units for performing other functions.

In an embodiment, the processor assembly 160 may acquire or pre-store performance information in real time and manage performance information related to a seat library to be provided by the slave kiosk.

In addition, in an embodiment, the processor assembly 160 may manage predetermined server information in a list of servers to be connected.

In addition, in an embodiment, the processor assembly 160 may manage current device settings. In detail, the current device settings may include the functions of setting an identification ID of the master kiosk, setting a manager password, managing an NFC ID used by the manager, and setting the basic language of the master and/or slave kiosk.

In addition, in an embodiment, the processor assembly 160 may manage a predetermined notice pop-up displayed on the display of the slave kiosk.

In addition, in an embodiment, the processor assembly 160 may collect pairing data including the number of pairings performed at each slave kiosk, the time required, etc., and generate and manage pairing statistical information.

In addition, in an embodiment, the processor assembly 160 may manage firmware to maintain the latest firmware of the cheering stick.

In addition, in an embodiment, the processor assembly 160 may set a preset for changing the theme, design, and/or design for each artist of the screen output on the display of the slave kiosk.

The aforementioned content is related to a function performed by the processor assembly 160 of the master kiosk, and the kiosk setting service may be provided to a manager who wishes to set various functions to be applied collectively to a plurality of slave kiosks installed in a concert hall.

The content described below is related a function performed by the processor assembly 160 of the slave kiosk. The cheering stick pairing service that provides the seat library according to the seat of a user by pairing the kiosk 100 and the cheering stick 200 of the user may be provided to a certain number of users who wish to use the kiosk to watch a performance.

In an embodiment, the processor assembly 160 may acquire user account information included in the account authentication device.

In addition, in an embodiment, the processor assembly 160 may detect ticket reservation information matched to the acquired user account information.

In addition, in an embodiment, the processor assembly 160 may extract seat information included in the detected ticket reservation information.

In addition, in an embodiment, the processor assembly 160 may determine the seat-library according to the extracted seat information.

In addition, in an embodiment, the processor assembly 160 may pair the cheering stick 200 to which the determined seat-library is to be transmitted.

In addition, in an embodiment, the processor assembly 160 may transmit the determined seat-library to the paired cheering stick 200.

In addition, depending on the embodiments, the kiosk 100 may further perform at least a portion of the functional operations performed by the performance management server 300, which will be described later.

The kiosk 100 including the plurality of configurations may be implemented as an integrated-type or a separable-type in terms of a hardware structure.

Figure 4:
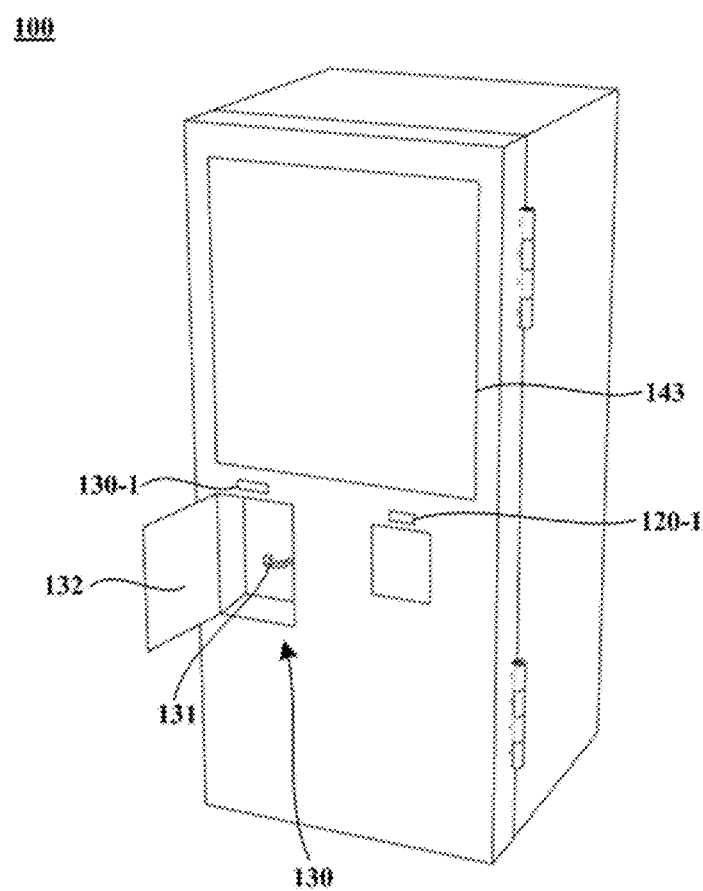
FIGS. 4 to 6 are examples showing the shape of a kiosk according to various embodiments of the present disclosure.
Figure 5:
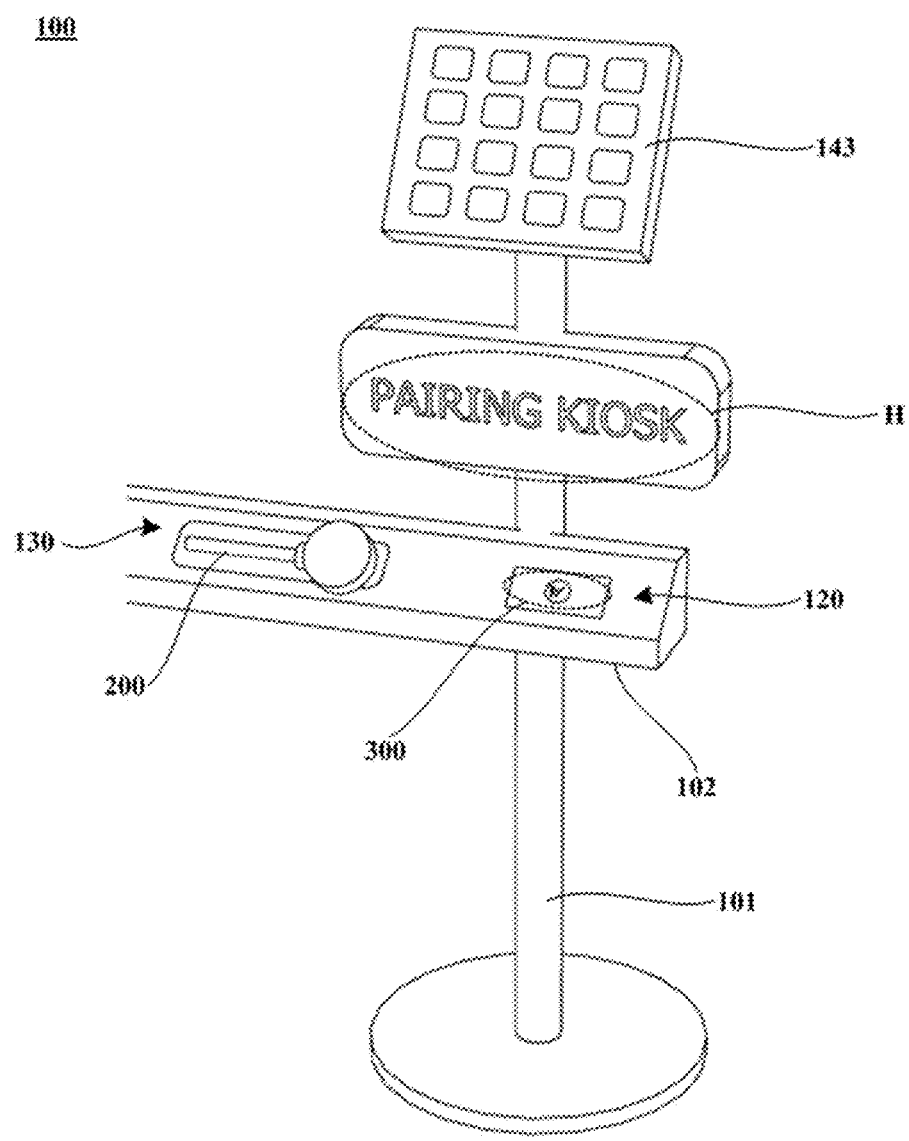
Figure 6:
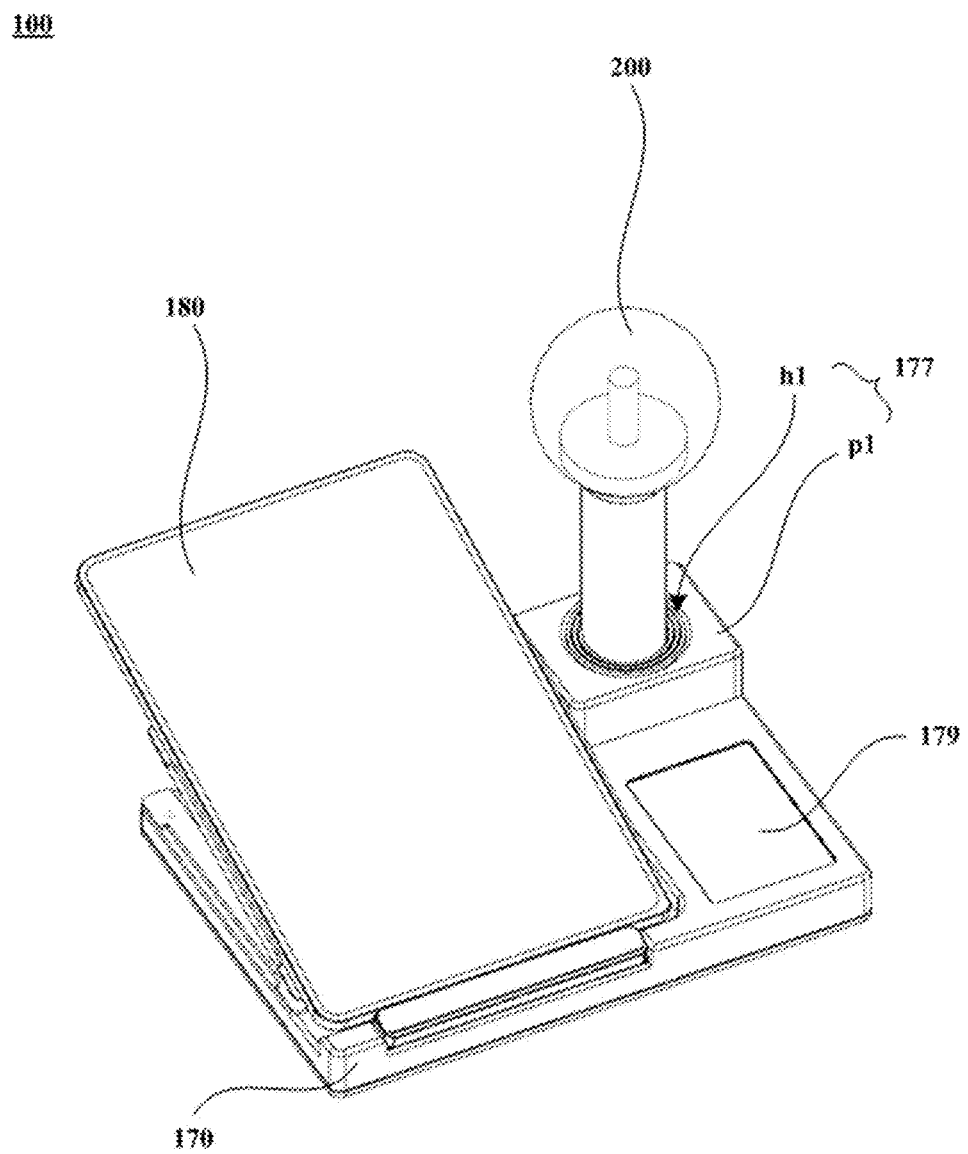

FIGS. 4 to 6 are examples showing the shape of a kiosk according to various embodiments of the present disclosure.

FIG. 4 shows an integrated-type kiosk in which the account tag module 120 and the cheering stick pairing module 130 are installed in the housing of the kiosk 100, FIG. 5 shows a separable-type kiosk in which the account tag module 120 and the cheering stick pairing module 130 are installed separately from the housing, and FIG. 6 shows a pedestal-type kiosk built on a predetermined structure in which a mobile-type computing device and a cheering stick 200 may be mounted.

Referring to FIG. 4, when the kiosk 100 is an integrated-type device according to the embodiment, the kiosk 100 may include the account tag module 120 and the cheering stick pairing module 130 within the housing.

In this connection, the account tag module 120 and the cheering stick pairing module 130 may be installed at such a location where a user may mount the cheering stick 200 or tag the account authentication device easily.

For example, as illustrated in FIG. 4, the account tag module 120 and the cheering stick pairing module 130 may be installed on one side of the lower end of the display 143.

In addition, in an embodiment, the account tag module 120 may be installed on the outer surface of the kiosk 100 in the form of a pad that may tag the account authentication device.

In addition, in an embodiment, the cheering stick pairing module 130 may be installed in the form of a box containing a space therein to accommodate and mount the cheering stick 200.

In addition, in an embodiment, the cheering stick pairing module 130 may include a predetermined pedestal 131 installed in the inner space to fix the cheering stick 200 accommodated therein or include a cover 132 for preventing the cheering stick 200 accommodated therein from being fallen out and blocking radio waves.

In addition, the account tag module 120 and the cheering stick pairing module 130 may further include a first LED module 120-1 and a second LED module 130-1 notifying that the plurality of modules has normally recognized a predetermined device (for example, the cheering stick 200 and the account authentication device).

Specifically, in an embodiment, the kiosk 100 may operate the first LED module 120-1 when the account authentication device is normally recognized by the account tag module 120.

In addition, in an embodiment, the kiosk 100 may operate the second LED module 130-1 when the cheering stick 200 is normally recognized by and mounted on the cheering stick pairing module 130.

In addition, the second LED module 130-1 may operate even after predetermined data has been transmitted to the cheering stick 200. In this case, the cheering stick pairing module 130 may open the cover 132 to provide the cheering stick 200 to the user at the same time the second LED module 130-1 is operated.

The integrated-type kiosk 100 does not require an additional device in addition to the kiosk 100 itself, thereby increasing the convenience of installation.

Referring to FIG. 5, when the kiosk 100 is a separable-type kiosk according to another embodiment, the display 143, the account tag module 120, and the cheering stick pairing module 130 may be installed separately from the housing H of the kiosk 100.

In this connection, the constituting elements of the kiosk 100 except for the account tag module 120 and the cheering stick pairing module 130 may be disposed in the housing (H).

In addition, in another embodiment, the kiosk 100 may further include a predetermined structure (for example, a support 101 and a shelf 102) for individually installing the display 143, the account tag module 120, and the cheering stick pairing module 130.

Specifically, in another embodiment, a support 101 for fixing the display 143 to a position separated by a predetermined height from the ground and a shelf 102 for mounting the cheering stick pairing module 130 may be further installed in the kiosk 100.

The display 143 may be positioned at the upper portion of the support 101, and the housing H may be positioned on one side of the support 101.

In addition, as illustrated in FIG. 5, the shelf 102 may be installed by being included in one side of the support 101 or may be installed in a form such as a desk separated from the support 101.

In addition, the shelf 102 may have a structure parallel to the ground to maintain the mounted state of the account tag module 120 in the process of pairing, the account authentication device mounted in the cheering stick pairing module 130, and the cheering stick 200.

The separable-type kiosk 100 may operate the display 143 while the cheering stick 200 and the account authentication device are mounted, thereby improving the user's convenience in operating the device.

The embodiments including the integrated-type and/or separable-type kiosk 100 have been described based on the assumption that the kiosk type is determined according to whether the housing H of the kiosk 100 is separated from predetermined constituting elements.

Hereinafter, the kiosk 100 may be referred to as a device comprising a terminal providing a seat-library to a predetermined cheering stick and a pedestal on which the terminal is mounted, regardless of whether the housing H is separated from predetermined constituting elements.

FIG. 6 shows one example in which a cheering stick is mounted on a pedestal-type kiosk according to another embodiment of the present disclosure.

According to another embodiment, when the kiosk 100 is a pedestal-type kiosk, it may be implemented in the form of a pedestal on which a mobile-type computing device is mounted. Hereinafter, for the convenience of description, the mobile-type computing device is implemented as a tablet, but the present disclosure is not limited to the specific example. In addition, hereinafter, the tablet may be referred to as a terminal 180.

Referring to FIG. 6, in another embodiment, the kiosk 100 may include a pedestal 170 including a terminal 180, a cheering stick holder 177, and a tagging portion 179.

In this connection, the terminal 180 may be mounted on one side of the pedestal 170, and the mounted terminal 180 may be detachable.

In addition, a cheering stick holder 177 having a structure into which the cheering stick 200 is inserted may be provided on one side of the pedestal 170.

In this connection, the cheering stick holder 177 may include an insertion hole h1 and a first protruding portion p1. The insertion hole h1 may be a hollow having a cylindrical shape to match the shape of the lower handle portion of the cheering stick 200 to be inserted; the first protruding portion p1 includes the insertion hole h1 and may have a protruding structure forming a step of a predetermined size.

In addition, a cylindrical layer of a predetermined size may be inserted into the insertion hole h1 to adapt to the cheering stick 200 having a different diameter.

In addition, the first protruding portion p1 may protrude in an upward direction by a predetermined length from the first surface of the pedestal on which the tagging portion 179 is disposed. In this connection, the predetermined length may be at least as long as the first protruding portion p1 securely supports the cheering stick 200 to be inserted (for example, ⅓ or more of the length of the handle of the cheering stick 200).

In addition, one side of the pedestal 170 may have a tagging portion 179, a predetermined area in which a predetermined device is disposed. For example, the tagging portion 179 may be provided in a predetermined area different from the area in which the cheering stick holder 177 is provided.

In addition, although not illustrated in FIG. 6, the cheering stick pairing module 130 may be included on one inner side of the cheering stick holder 177, and the account tag module 120 may be included on one inner side of the tagging portion 179. Accordingly, in another embodiment, the kiosk 100 may perform short-distance communication with the cheering stick 200 mounted on the cheering stick holder 177 and/or the account authentication device tagged by the tagging portion 179.

In other words, the pedestal-type kiosk 100 may be installed together with a predetermined structure (for example, table) inside or near the auditorium; thus, at least one or more users may mount the cheering stick carried by the user into the cheering stick holder 177 and operate the terminal 180 mounted in advance on the pedestal 170 to download a predetermined seat-library to the cheering stick 200.

Cheering Stick 200

In an embodiment of the present disclosure, the cheering stick 200 may be a predetermined device that emits light according to a seat-library received from the kiosk 100 based on the cheering stick pairing service.

Figure 7:
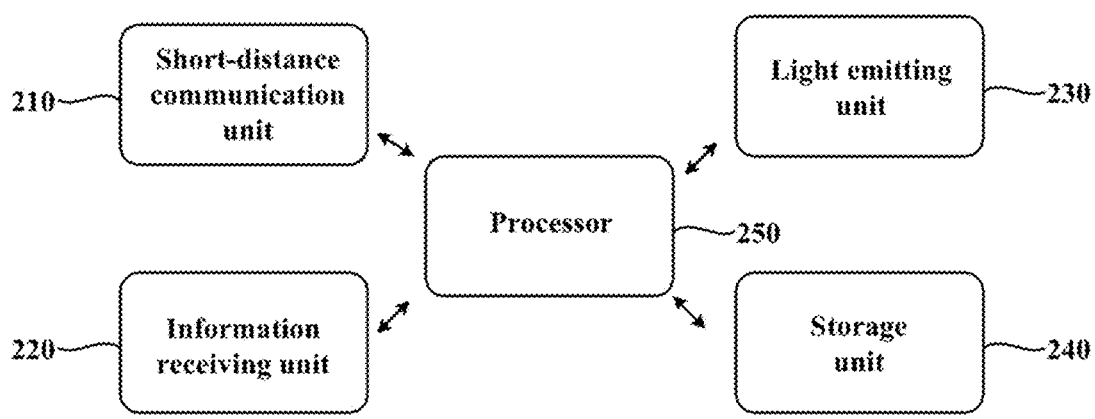
FIG. 7 is an internal block diagram of a cheering stick according to an embodiment of the present disclosure.

FIG. 7 is an internal block diagram of a cheering stick according to an embodiment of the present disclosure.

Referring to FIG. 7, to this end, in an embodiment, the cheering stick 200 may include a short-distance communication unit 210, an information receiving unit 220, a light emitting unit 230, a storage unit 240, and a processor 250.

The short-distance communication unit 210 may include one or more devices for communicating with an external device. The short-distance communication unit 210 may communicate through a wireless network.

In an embodiment, the short-distance communication unit 210 may transmit and receive various pieces of data related to the cheering stick pairing service to and from another terminal and/or an external server.

Specifically, in an embodiment, the short-distance communication unit 210 may connect communication system between the kiosk 100 and the cheering stick 200 by performing pairing based on the cheering stick pairing module 130 of the kiosk 100 and, accordingly, receive the user's seat information and a seat-library corresponding to the seat.

The short-distance communication unit 210 may include a wireless communication module (for example, at least one of an NFC module, an RF transmitter/receiver, a ZigBee module, a Bluetooth module, and a WIFI module).

In an embodiment, the short-distance communication unit 210 may receive at least one or more data of user account information, user seat information, and a seat-library from the kiosk 100 through short-distance communication using Bluetooth communication.

The information receiving unit 220 may receive information transmitted from the kiosk 100 and other devices through a broadcasting method.

Specifically, in an embodiment, the information receiving unit 220 may receive signals transmitted from the kiosk 100 and other devices without designating recipients.

The light emitting unit 230 may perform a function of emitting light according to a signal received by the information receiving unit 220.

The light emitting unit 230 may include one or more light source elements, and the light source may include a light emitting diode (LED). In addition, the light emitting unit 230 may include LEDs of different colors; for example, the light emitting unit 230 may include at least one of a red LED, a green LED, a blue LED, and a white LED.

When the light emitted from each of these LEDs is mixed, a wide range of colors may be created, and the mixed color is determined based on the ratio of the intensities of light emitted from each LED, where the intensity of light emitted from each LED may be proportional to the driving current of the LED.

In the description above, LED is used as a light source of the light emitting unit 230, but the type of light source is not limited to the LED. According to another embodiment, an organic light emitting diode (OLED) may also be used as the light source.

The storage unit 240 may store one or more of various application programs, applications, data, and commands for providing the cheering stick pairing service environment.

In addition, the storage unit 240 may store data received from or generated by other constituting elements of the kiosk setting system. The storage unit 240 may be, for example, one of various storage devices such as a ROM, an EPROM, a flash drive, and a hard drive and may include a memory, a cache, and a buffer.

In an embodiment, the storage unit 240 may pre-store the information necessary to perform a light emission function of the cheering stick 200.

For example, the storage unit 240 may pre-store light emitting pattern data.

The light emitting pattern data means the data including the respective light emitting pattern setting values defined in an embodiment for expressing all colors and brightness levels that the cheering stick may implement. For example, the light emitting pattern data may include a plurality of data having a value of (0, 0, 0), (0, 0, 1), (0, 0, 2), . . . , (n, n, n) for expressing color. In addition, the light emitting pattern data may include a plurality of data having a value of 0, 1, 2, . . . , n for expressing brightness.

In other words, the storage unit 240 may pre-store the light emitting pattern data; accordingly, the user may manually determine whether to set the cheering stick 200 to emit light, color, brightness, and a light emission effect independently of whether a seat-library is stored.

In addition, in an embodiment, the storage unit 240 may store information necessary to perform the cheering stick pairing service.

For example, the storage unit 240 may store a seat-library. In this case, the seat-library may be received from another device and stored in the storage unit 240.

The processor 250 may perform the overall operation such as power supply control of the cheering stick 200 and a data processing function of controlling a signal flow between internal constituting elements and processing data. The processor 250 may include at least one processor.

In addition, the processor 250 may communicate with each constituting element internally through a system bus and may include one or more predetermined bus structures including a local bus.

In addition, the processor 250 may be implemented by using at least one of application-specific integrated circuits (ASICs), digital signal processors (DSPs), digital signal processing devices (DSPDs), programmable logic devices (PLDs), field programmable gate arrays (FPGAs), controllers, micro-controllers, microprocessors, and electric units for performing other functions.

In an embodiment, the processor 250 may control the light emitting pattern of the light output from the light emitting unit 230 by controlling the driving current of each LED of the light emitting unit 230.

Through the operation above, in an embodiment, the processor 250 may control the cheering stick 200 including a plurality of LEDs and may form a predetermined text, image, or video.

The short-distance communication unit 210 and the information receiving unit 220 may be a functional unit separately shown to distinguish at least particular functions of the processor 250 from the general functions of the processor 250.

The cheering stick 200 including the above structure may operate according to at least one or more data stored in the storage unit 240 under the control of the processor 250. As a plurality of users gathers in an auditorium, performance directing may be carried out such that a plurality of cheering sticks 200 are arranged, and a predetermined phrase and image are formed using the cheering sticks 200.

Performance Management Server: 300

The performance management server 300 according to an embodiment of the present disclosure may perform a series of processes for providing the kiosk setting service and/or cheering stick pairing service.

In an embodiment, the performance management server 300 is a central management device that controls the master kiosk and/or slave kiosks, and may be implemented as a predetermined computing device.

Specifically, in an embodiment, the performance management server 300 may provide the kiosk setting service and/or cheering stick pairing service by exchanging, with an external device such as the kiosk 100, data necessary for operating a kiosk setting process and/or cheering stick paring process in the external device.

More specifically, in an embodiment, the performance management server 300 may provide an environment in which a plurality of applications installed in a plurality of devices performing the kiosk setting service in an external device may operate.

To this end, the performance management server 300 may include an application program, data, and/or commands for operating the application and may transmit and receive data based thereon to and from the external device.

Specifically, the performance management server 300 may provide the kiosk setting service and/or cheering stick pairing service based on a kiosk setting program for setting the master kiosk and a cheering stick pairing program for providing the cheering stick pairing service at the slave kiosk.

In an embodiment, the performance management server 300 may generate and/or acquire performance information that is stored in each kiosk and may be set.

In addition, in an embodiment, the performance management server 300 may transmit performance information to the kiosk 100.

In addition, in an embodiment, the performance management server 300 may comprehensively control at least one connected kiosk.

In addition, in an embodiment, the performance management server 300 may acquire predetermined data collected according to pairing performed at at least one kiosk.

In addition, in an embodiment, the performance management server 300 may acquire at least one or more pieces of ticket reservation information by communicating with an external server (for example, a ticket sales server).

In this connection, the ticket reservation information may include the name and date of birth of the person who has purchased the ticket, ticket site ID, a mobile phone number, a performance name, performance date and time, a performance venue, a reservation number, the number of advance tickets, and seat information.

In addition, in an embodiment, the performance management server 300 may provide, to an external device (in an embodiment, a kiosk 100), ticket reservation information matching the user account information among the at least one or more ticket reservation information acquired.

In this connection, in an embodiment, the performance management server 300 may determine whether the ticket reservation information matches the user account information based on the mobile phone number, which is the information common to each piece of information. This case is only an example; various other embodiments determine whether the ticket reservation information matches the user account information using the user's personal information other than a mobile phone number.

In addition, in an embodiment, the performance management server 300 may extract seat information from the matched ticket reservation information.

In this connection, the seat information in an embodiment is used as a reference for distinguishing the cheering data 1000 for each seat; in an embodiment, the performance management server 300 may generate a plurality of seat libraries by matching the seat information to the cheering data 1000.

In addition, in an embodiment, the seat information may include at least one of the seat number and the pixel number.

In an embodiment, when the seat information is exposed to the user, the seat information is exposed using a seat number used in an actual auditorium in the form of, for example, "3rd floor, 12th section, row A, no. 1"; however, in the case of a device exhibiting a light emitting pattern, the seat information may be exposed using a pixel number based on a seating chart for the convenience of performance directing.

In other words, the cheering data using a pixel number in a director's device may be converted to a seat number when the performance preparation data is generated as a seat-library in the performance management server 300, and for this purpose, the pixel number may be matched in advance to the corresponding seat number.

In addition, in an embodiment, the performance management server 300 may pre-store and manage a plurality of seat libraries generated for each seat number in the database 330.

In addition, in an embodiment, the performance management server 300 may provide a seat-library generated according to the extracted seat information to an external device (in an embodiment, the cheering stick 200 and the account authentication device 300).

In addition, in an embodiment, the performance management server 300 may store and manage various application programs, commands, and/or data for implementing the kiosk setting service and/or cheering stick pairing service.

Referring further to FIG. 1, the performance management server 300 in an embodiment may be implemented using a predetermined computing device including at least one or more processor modules 310 for data processing, at least one or more communication modules 320 for data exchange with an external device, and at least one or more memory modules 330 for storing various application programs, data, and/or commands for providing a library pairing service.

Herein, the database 330 may store one or more of an operating system (OS), various application programs, data, and commands for providing a library pairing service.

In addition, the database 330 may include a program and data areas.

Herein, the program area according to the embodiment may be linked between an operating system (OS) for booting a server and functional elements, and the data area may store data generated according to the use of the server.

In an embodiment, the database 330 may be one of various storage devices, such as a ROM, a RAM, an EPROM, a flash drive, and a hard drive; and may be a web storage performing a storage function of the database 330 on the Internet.

In addition, the database 330 may be a recording medium detachable from a server.

The processor module 310 may control the overall operation of the respective units to implement a library pairing service.

The processor module 310 may be a system-on-chip (SOC) suitable for a server including a central processing unit (CPU) and/or a graphic processing unit (GPU), execute the operating system (OS) and/or an application program stored in the database 530, and control the respective constituting elements mounted on the server.

In addition, the processor module 310 may communicate with each constituting element internally through a system bus and may include one or more predetermined bus structures including a local bus.

In addition, the processor module 310 may be implemented by using at least one of application-specific integrated circuits (ASICs), digital signal processors (DSPs), digital signal processing devices (DSPDs), programmable logic devices (PLDs), field programmable gate arrays (FPGAs), controllers, micro-controllers, microprocessors, and electric units for performing other functions.

In the description above, it was assumed that the performance management server 300 according to an embodiment of the present disclosure performs the functional operation as described above. Depending on the embodiments, however, various embodiments may be implemented such that an external device (for example, a kiosk 100) may perform at least part of the functional operation performed by the performance management server 300, or the performance management server 300 may further perform at least part of the functional operation performed in the external device.

Kiosk Setting Method for Cheering Stick Pairing Service of Master Kiosk

Hereinafter, a method of setting a master kiosk for a cheering stick pairing service to be provided by a slave kiosk by the processor assembly 160 including at least one processor of the kiosk 100 (in an embodiment, the master kiosk) according to an embodiment of the present disclosure will be described in detail with reference to FIGS. 8 to 11 attached.

In an embodiment of the present disclosure, the processor assembly 160 including at least one processor of the kiosk 100 may execute at least one program and/or application stored in at least one memory 150 or operates in a background state.

Hereinafter, the processor assembly 160 operates to execute the command of the kiosk 100 and performs the kiosk setting method for the cheering stick pairing service described above. This will be briefly described as the kiosk 100 performing the operation.

Figure 8:
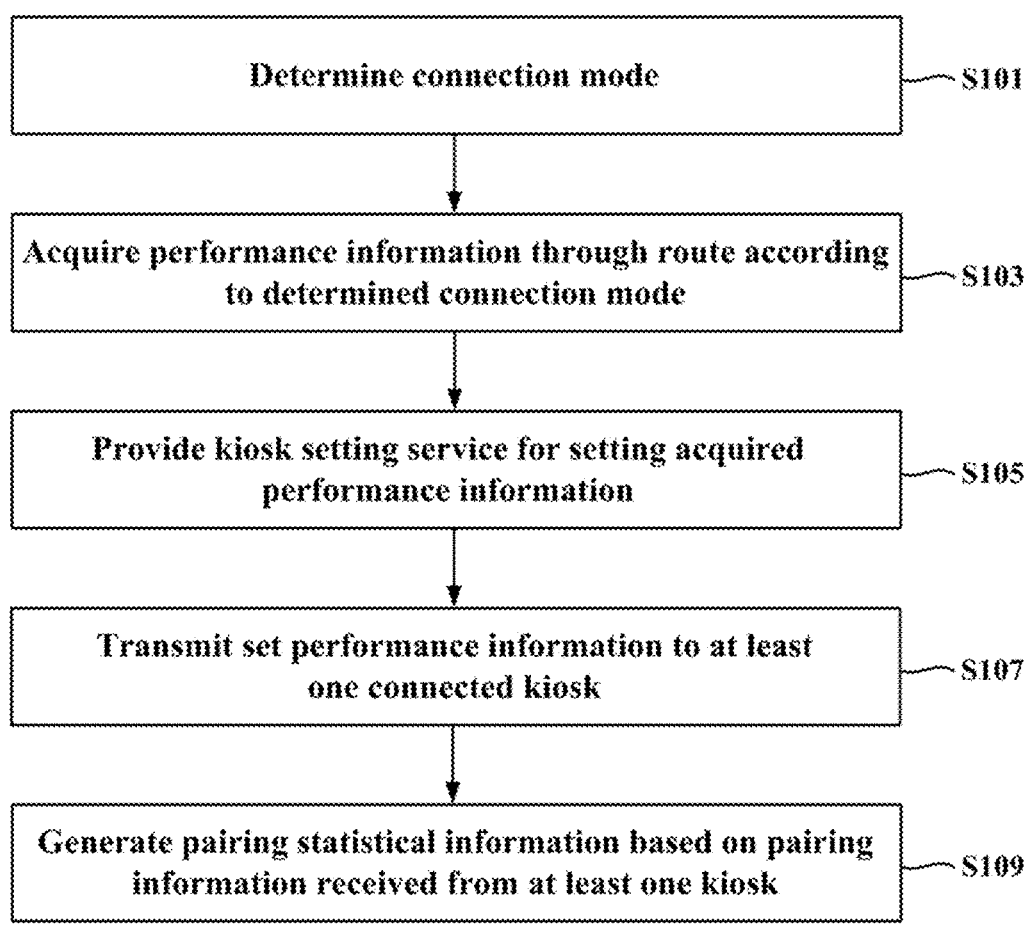
FIG. 8 is a flowchart illustrating a kiosk setting method for a cheering stick pairing service according to an embodiment of the present disclosure.

FIG. 8 is a flowchart illustrating a kiosk setting method for a cheering stick pairing service according to an embodiment of the present disclosure.

Referring to FIG. 8, in an embodiment, the kiosk 100 may determine a connection mode (S101).

Specifically, in an embodiment, the kiosk 100 may determine one of an online connection mode and/or an offline connection mode.

Figure 9A:
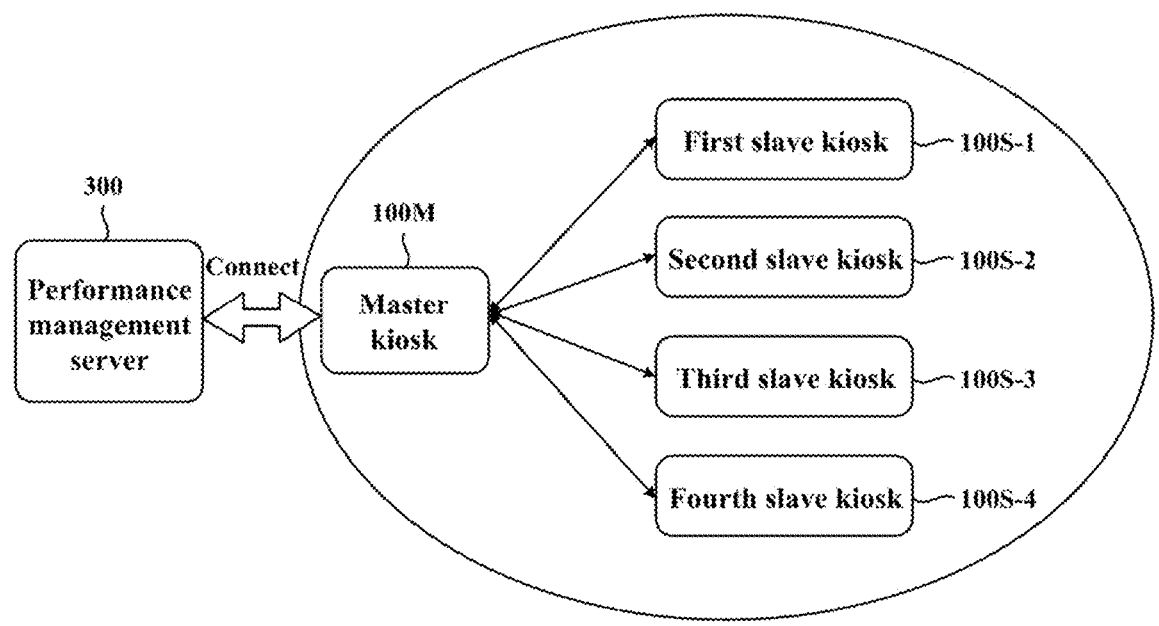
FIG. 9A and FIG. 9B are examples of a diagram for explaining a connection mode according to an embodiment of the present disclosure.
Figure 9B:
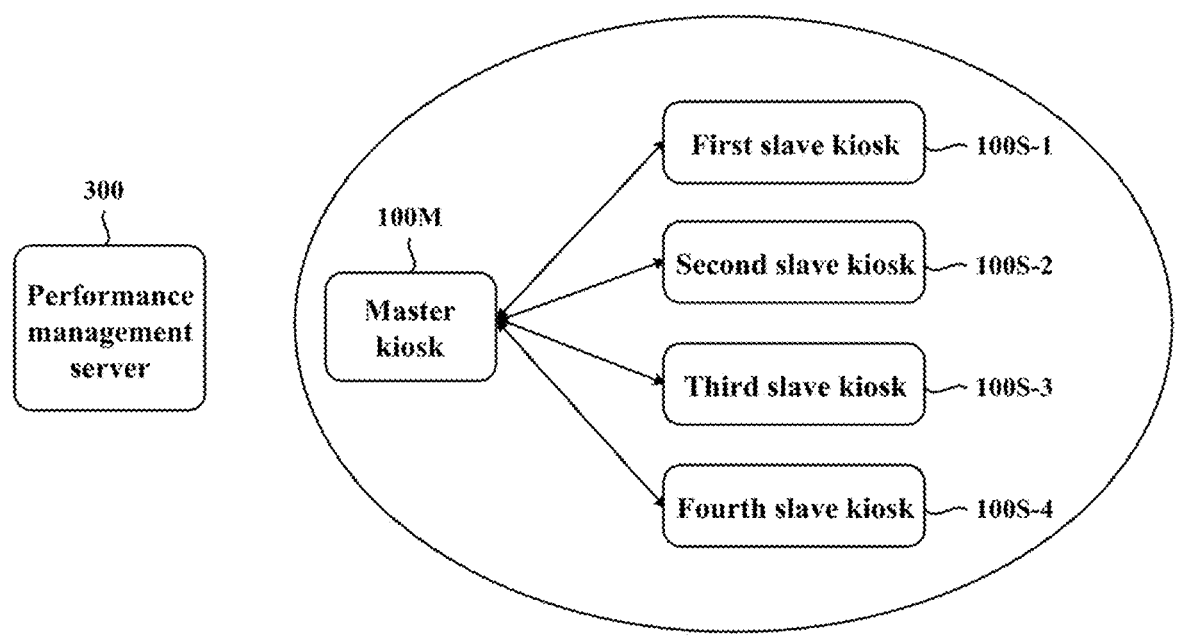

FIG. 9A and FIG. 9B are examples of a diagram for explaining a connection mode according to an embodiment of the present disclosure.

In detail, FIG. 9A is an example explaining the online connection mode, and FIG. 9B is an example explaining the offline connection mode.

Referring to FIG. 9A, in an embodiment, the Internet environment of the kiosk 100 at a concert hall is reliable, and Internet connection with the performance management server 300 and the master kiosk 100M is always possible at the site. When real-time communication is possible, the online connection mode may be determined.

To this end, in an embodiment, the kiosk 100 may access the performance management server 300 through a predetermined access process.

Accordingly, in an embodiment, the kiosk 100 may receive performance information pre-stored in the performance management server 300 or generated in real time.

Herein, the performance information according to an embodiment may include all pieces of information necessary to perform the kiosk setting service and/or cheering stick pairing service for a performance.

In detail, the performance information may include connection server information, device setting information, pop-up information, pairing statistical information, firmware information, and/or preset information for the kiosk setting service. In addition, the performance information may further include performance preparation information including the performance name, artist name, performance time, performance location, and cheering data (in detail, at least one seat library) for the performance corresponding to the seat library to be provided as a cheering stick for the cheering stick pairing service, user account information for identifying users, ticket reservation information, and/or seat information.

Hereinafter, the cheering stick pairing service may be used to encompass the kiosk setting service and cheering stick pairing service.

In addition, in an embodiment, when the online connection mode is determined, the master kiosk may perform a hotspot function.

In this connection, at least one slave kiosk 100S-1, 100S-2, 100S-3, and 100S-4 may receive predetermined information including the performance information through the master kiosk 100M through indirect communication rather than direct communication with the performance management server 300.

In addition, the master kiosk 100M may receive predetermined information generated by the slave kiosks 100S-1, 100S-2, 100S-3, and 100S-4 and transmit the same to the performance management server 300.

In addition, referring to FIG. 9B, in an embodiment, the kiosk 100 may determine the offline connection mode when the Internet environment at a concert hall site is unstable and Internet connection with the performance management server 300 and the master kiosk 100M is impossible at the site.

To this end, in an embodiment, the kiosk 100 may acquire the latest version of performance information in advance from the performance management server 300 in an area where the Internet environment is reliable and pre-store the same in the memory 150.

In addition, in an embodiment, when the offline connection mode is determined, the master kiosk 100M is unable to communicate in real time with the performance management server 300, but as an AP, a plurality of slave kiosks 100S-1, 100S-2, 100S-3, and 100S-4 may form an independent wireless network with each thereof.

Specifically, the master kiosk 100M may also communicate in offline connection mode with each of a plurality of slave kiosks 100S-1, 100S-2, 100S-3, and 100S-4 based on a wireless network including Wi-Fi connection and/or Bluetooth connection.

In this connection, at least one slave kiosk 100S-1, 100S-2, 100S-3, and 100S-4 may indirectly receive predetermined information including the latest version of performance information from the master kiosk 100M.

In addition, when the wireless network (for example, Wi-Fi and/or Bluetooth) between the master kiosk 100M and the slave kiosks 100S-1, 100S-2, 100S-3, and 100S-4 is not smooth, each slave kiosk may store pairing information on its own. In addition, in an embodiment, the slave kiosks 100S-1, 100S-2, 100S-3, and 100S-4 may transmit the stored pairing information back to the master kiosk 100M when the wireless network becomes smooth.

In addition, in an embodiment, the kiosk 100 may acquire performance information through a route according to the determined connection mode (S103).

Specifically, in an embodiment, the kiosk 100 may acquire performance information generated in real time from the performance management server 300 when the online connection mode is determined, and may acquire performance information pre-stored in the memory 150 when the offline connection mode is determined.

In addition, in an embodiment, the kiosk 100 may match the acquired performance information to the kiosk ID of the corresponding master kiosk.

In addition, in an embodiment, the kiosk 100 may also acquire performance information from the performance management server 300 and/or a predetermined performance manager device.

Herein, the performance manager device is a device that may independently set a plurality of pieces of information included in performance preparation information, and may be, for example, a mobile type and/or desktop type computing device.

In an embodiment, this performance manager device may transmit the latest version of performance information to the master kiosk and/or performance management server 300.

The reason why the performance manager device may transmit performance information to the master kiosk and/or performance management server 300 is that even when detailed information related to a performance is suddenly changed, such as a change in concert hall, change in performance direction, change in performance table of contents, etc., immediate response is possible by transmitting performance information by independently setting only the necessary portions in the performance manager device without modifying the entire performance information, which may dramatically increase efficiency and convenience in performance management.

This performance manager device may generate the latest version of performance information and transmit the same indirectly to the performance management server 300 or directly to the master kiosk.

To this end, in an embodiment, the kiosk 100 may be connected to the performance manager device by wired and/or wirelessly (for example, Wi-Fi connection and/or Bluetooth connection).

Accordingly, in an embodiment, the kiosk 100 may acquire performance information from the performance manager device and store the same in the memory 150.

In other words, in an embodiment, the kiosk 100 may receive and store performance information for at least one performance from the path according to the determined connection mode, the performance manager device, and/or the performance management server 300.

In addition, in an embodiment, the kiosk 100 may provide the kiosk setting service for setting the acquired performance information (S105).

To this end, in an embodiment, the kiosk 100 may provide a first kiosk setting interface and a second kiosk setting interface. Herein, the setting according to an embodiment may mean the information provided to users who will use the slave kiosk when the cheering stick pairing service is provided on the slave kiosk and a process of setting content displayed on a kiosk screen on the master kiosk and applying the same to at least one slave kiosk connected to the master kiosk.

In addition, in an embodiment, the setting may be performed based on a first kiosk setting interface for setting performance information (for example, connection server information, device setting information, pop-up information, pairing statistical information, firmware information, and preset information) excluding performance preparation information and/or a second kiosk setting interface for setting the performance preparation information. The second kiosk setting interface may include a function to change the value set through the first kiosk setting interface.

For convenience of explanation, hereinafter, the process that the kiosk 100 performs based on the first kiosk setting interface may be referred to as a basic setting, and the process performed based on the second kiosk setting interface may be referred to as an additional setting. In addition, the information set by the kiosk 100 based on the first and second kiosk setting interfaces may be collectively referred to as setting information.

For example, when the kiosk 100 provides the cheering stick pairing service through the slave kiosk, it may set basic settings for notice pop-ups displayed on the display of the slave kiosk, themes such as background color and font, and device settings. In addition, for example, the kiosk 100 may additionally set the performance name, artist name, cheering data, and seat library for the performance provided through the corresponding slave kiosk.

In an embodiment, the kiosk 100 may set performance information acquired based on a manager UI.

Figure 10:
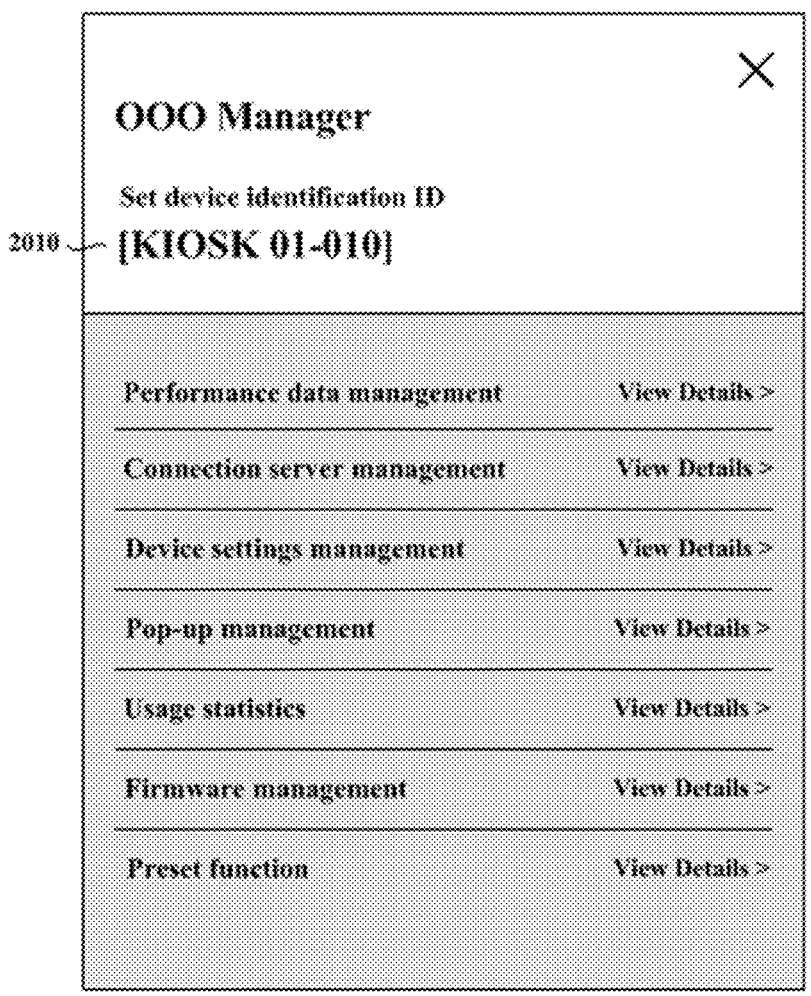
FIG. 10 is an example of a manager UI according to an embodiment of the present disclosure.

FIG. 10 is an example of a manager UI according to an embodiment of the present disclosure.

Referring to FIG. 10, in an embodiment, the kiosk 100 may set performance information matched to the kiosk ID 2010 of the master kiosk based on a manager UI 2000.

In an embodiment, the kiosk 100 may set performance preparation information, connection server information, device setting information, pop-up information, pairing statistical information, firmware information, and/or preset information included in the performance information according to user input based on the manager UI 2000.

In detail, in an embodiment, the kiosk 100 may set connection server information, device setting information, pop-up information, pairing statistical information, firmware information, and/or preset information according to user (specifically, a manager) input based on the manager UI 2000 including the first kiosk setting interface, and set performance preparation information according to user (specifically, a manager) input based on the manager UI 2000 including the second kiosk setting interface.

In an embodiment, the kiosk 100 may manage performance preparation information based on the manager UI 2000 including the second kiosk setting interface.

In an embodiment, the kiosk 100 may display at least one piece of performance preparation information matched to the kiosk ID 2010 in a list.

In addition, in an embodiment, the kiosk 100 may add and/or delete at least one piece of performance preparation information based on a predetermined user (specifically, a manger) input.

In addition, in an embodiment, the kiosk 100 may display the performance name, artist name, performance time, performance location, and cheering data of each piece of performance preparation information.

In this connection, in an embodiment, the kiosk 100 may activate performance preparation information that will be the subject of the cheering stick pairing service based on a predetermined user (specifically, a manager) input.

In addition, in an embodiment, the kiosk 100 may display a list of downloadable cheering data among at least one cheering data included in the activated performance preparation information.

As such, the cheering data may be added, deleted, and/or activated based on predetermined user input.

In detail, the performance preparation information and/or cheering data may be acquired and added from the performance manager device and/or performance management server 300 recognized by the kiosk 100.

In addition, in an embodiment, the kiosk 100 may acquire and modify ticket reservation information included in activated performance preparation information, and user account information and/or seat information matched to the ticket reservation information. In this connection, it may be determined whether to activate an OCR module to recognize the ticket including the ticket reservation information.

In an embodiment, the kiosk 100 may manage connection server information based on the manager UI 2000 including the first kiosk setting interface.

In addition, in an embodiment, the kiosk 100 may display a list of communicationable performance management servers 300 and/or external servers when the determined connection mode is an online connection mode. In addition, in an embodiment, the kiosk 100 may communicate with at least one server determined based on predetermined user input.

In an embodiment, the kiosk 100 may manage device setting information based on the manager UI 2000 including the first kiosk setting interface.

In addition, in an embodiment, the kiosk 100 may manage (add, delete, and/or modify) a manager password, kiosk ID, and manager NFC ID of the corresponding master kiosk.

In this connection, the manager NFC ID may be added by reading the manager device tagged based on the account tag module 120 of the kiosk 100.

In an embodiment, the kiosk 100 may manage pop-up information based on the manager UI 2000 including the first kiosk setting interface.

In addition, in an embodiment, the kiosk 100 may manage (add, delete, modify, and/or activate) pop-up information including predetermined notice content to be displayed on at least one slave kiosk.

In this connection, in an embodiment, the kiosk 100 may determine the language to be applied to the pop-up information. In addition, in an embodiment, when the kiosk 100 shows two or more pop-ups activated on the same screen, pop-ups that are temporally earlier may be exposed first, and recently added pop-ups may be exposed later.

In addition, in an embodiment, the kiosk 100 may set the pop-up title, pop-up content, pop-up design, and/or pop-up exposure position included in the pop-up information.

In addition, in an embodiment, the kiosk 100 may generate pairing statistical information and manage the pairing statistical information based on the manager UI 2000 including the first kiosk setting interface.

In this connection, in an embodiment, the kiosk 100 may generate the pairing statistical information based on pairing information acquired from at least one slave kiosk, and details thereabout will be described later.

In addition, in an embodiment, the kiosk 100 may manage firmware information based on the manager UI 2000 including the first kiosk setting interface.

In detail, in an embodiment, the kiosk 100 may generate a firmware list including serial number, CID, AID, DID, and firmware version information, and manage (add, delete, modify, and/or activate) at least one firmware.

In addition, in an embodiment, the kiosk 100 may manage preset information based on the manager UI 2000 including the first kiosk setting interface.

In detail, in an embodiment, the kiosk 100 may set the background color, button color, font, font color, and/or artist logo image that constitute the content to be exposed on the display when the slave kiosk provides the cheering stick pairing service.

This preset information may be stored for each artist by setting the signature logo, theme, font, and color of the artist.

The preset information stored for each artist may be reused when the same artist performs in the future, thus improving the work efficiency of preset workers. In addition, the same preset is displayed on a slave kiosk screen no matter when and where the artist performs, and thus from the perspective of users (fans) who perform cheering stick pairing using the slave kiosk screen, the information of the artist the users wish to pair with may be reconfirmed and a sense of stability may be felt from the unified design.

In an embodiment through the aforementioned stages, when the kiosk 100 completes the basic setting and additional setting processes through the first and second kiosk setting interfaces, the set performance information may be transmitted to at least one connected kiosk (S107)

In this connection, the at least one connected kiosk may be the slave kiosk 100S-1, 100S-2, 100S-3, or 100S-4.

Accordingly, in an embodiment, the at least one slave kiosk 100S-1, 100S-2, 100S-3, or 100S-4 may receive the set performance information and provide the cheering stick pairing service to a user (specifically, a fan who wishes to download the seat library) based on the set performance information.

In addition, in an embodiment, the at least one slave kiosk 100S-1, 100S-2, 100S-3, or 100S-4 may transmit pairing information to the master kiosk 100M when provision of the cheering stick pairing service is completed.

Accordingly, in an embodiment, the kiosk 100 may generate pairing statistics based on pairing information received from the at least one slave kiosk 100S-1, 100S-2, 100S-3, or 100S-4 (S109).

In addition, in an embodiment, the kiosk 100 may generate pairing statistical information and manage the pairing statistical information based on the manager UI 2000.

Figure 11:
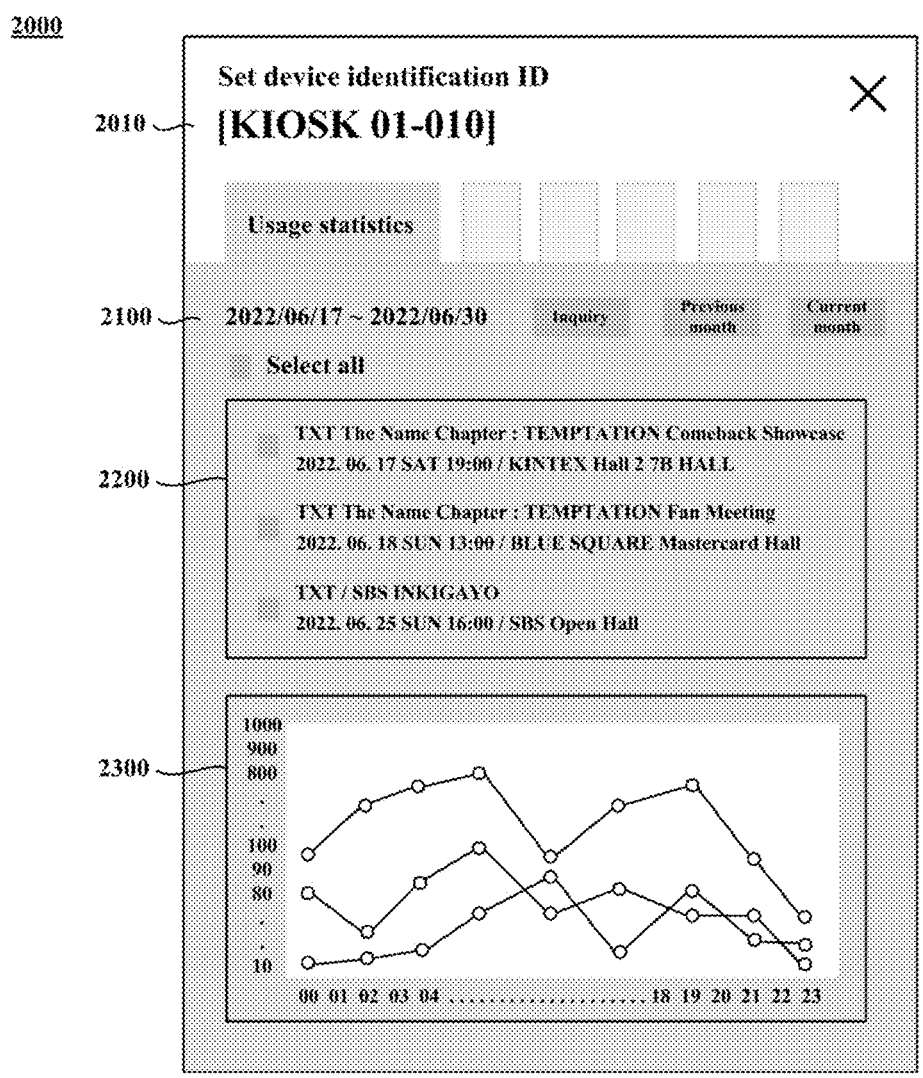
FIG. 11 is a diagram showing an example of a manager UI in which pairing statistical information is exposed according to an embodiment of the present disclosure.

FIG. 11 is a diagram showing an example of a manager UI in which pairing statistical information is exposed according to an embodiment of the present disclosure.

Referring to FIG. 11, in an embodiment, the kiosk 100 may query pairing information acquired from at least one slave kiosk.

In this connection, the pairing information may include log information stored at the time of transmitting the seat library from the slave kiosk to the cheering stick. In an embodiment, the log information may include UTC, local time, performance name, artist name, performance date and time, performance location, and/or storage date and time.

In addition, in an embodiment, the kiosk 100 may set a predetermined condition and filter only the pairing information that is the target for producing statistics among the searched pairing information.

For example, in an embodiment, the kiosk 100 may filter pairing information by setting the date on which statistics are to be produced as a first condition 2100.

In addition, for example, in an embodiment, the kiosk 100 may filter pairing information by setting performance preparation information for which statistics are to be produced as a second condition 2200.

In addition, in an embodiment, the kiosk 100 may provide a pairing statistics list and/or a pairing statistics graph in which filtered pairing information is sorted according to the number of transmissions by time period.

For example, the horizontal column of the pairing statistics graph 2300 may be time, and the vertical column may be the number of transmissions.

In addition, in an embodiment, the kiosk 100 may separately download at least one piece of acquired pairing information or initialize log information included in the acquired pairing information.

Method of Providing, by Set Slave Kiosk, Cheering Stick Pairing Service

Hereinafter, a method of providing a cheering stick paring service by the processor assembly 160 including at least one processor of the kiosk 100 (in an embodiment, the slave kiosk) according to an embodiment of the present disclosure will be described in detail with reference to FIGS. 12 and 13 attached.

In an embodiment of the present disclosure, the processor assembly 160 including at least one processor of the kiosk 100 may execute at least one program and/or application stored in at least one memory 150 or operates in a background state.

Hereinafter, the processor assembly 160 operates to execute the command of the kiosk 100 and performs the kiosk setting method for the cheering stick pairing service described above. This will be briefly described as the kiosk 100 performing the operation.

Figure 12:
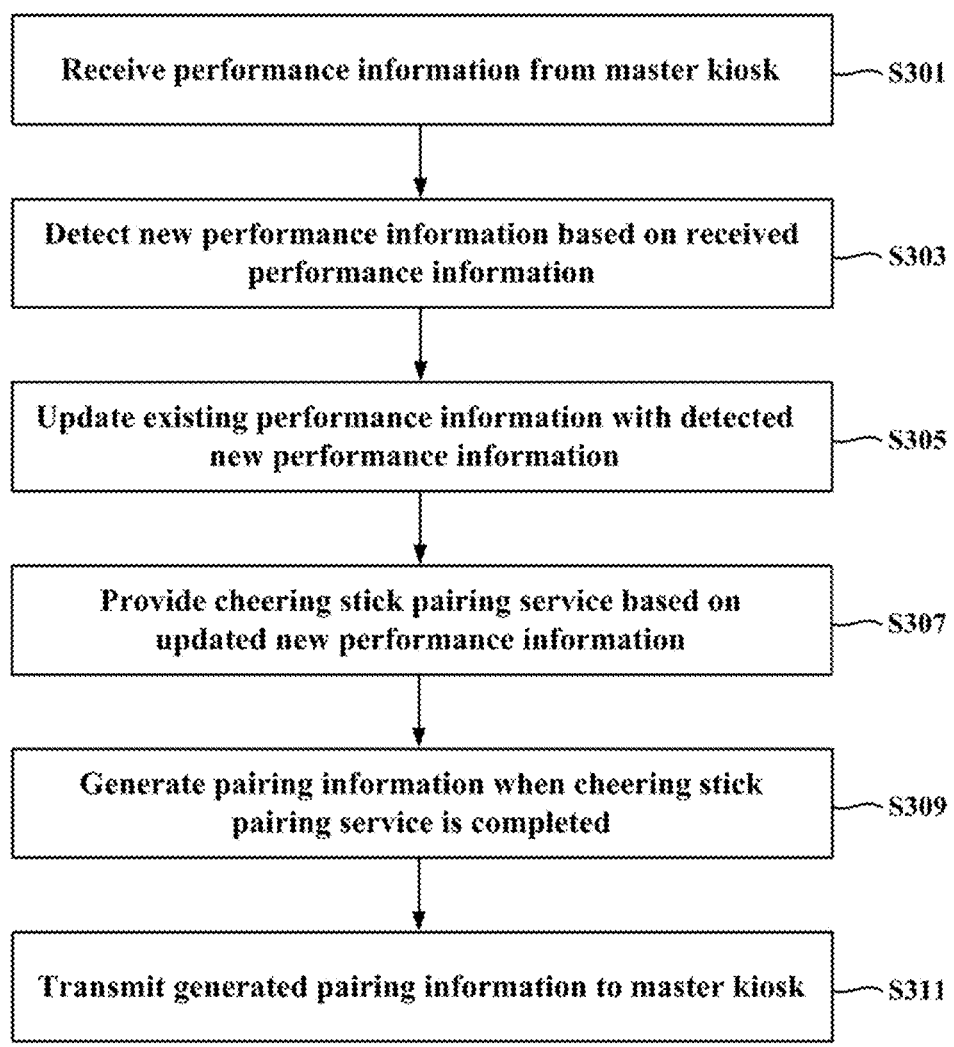
FIG. 12 is a flowchart illustrating a method in which a kiosk set up according to an embodiment of the present disclosure provides a cheering stick pairing service.

FIG. 12 is a flowchart illustrating a method in which a kiosk set up according to an embodiment of the present disclosure provides a cheering stick pairing service.

Referring to FIG. 12, in an embodiment, the kiosk 100 may receive performance information from the master kiosk (S301).

In detail, in an embodiment, when the kiosk 100 is in online connection mode, the master kiosk may receive performance information received in real time from the performance management server through the master kiosk, and when the kiosk 100 is in offline connection mode, the master kiosk may receive performance information received from the performance management server 300 and previously stored in memory 150 through the master kiosk.

In addition, in an embodiment, the kiosk 100 may detect new performance information based on the received performance information (S303).

To this end, in an embodiment, the kiosk 100 may compare the performance information previously stored in the memory 150 of the existing kiosk 100 with the received performance information. Herein, the received performance information may have the same concept as the setting information received from the master kiosk.

In addition, in an embodiment, the kiosk 100 may detect information (hereinafter referred to as new performance information) excluding information that is the same as at least one piece of information included in the previously stored performance information among the received performance information.

In other words, in an embodiment, the new performance information may be at least one of performance preparation information, connection server information, device setting information, pop-up information, pairing statistical information, firmware information, and/or preset information.

For example, when the received performance information is the same as the performance information and preset information previously stored in the memory 150 of the kiosk 100, and the performance preparation information is different, the kiosk 100 may detect the performance preparation information as new performance information.

Accordingly, when the predetermined settings of the kiosk set when providing the cheering stick pairing service are created and set once, these settings may be used multiple times each time a performance is produced. Only the information that needs to be modified may be modified and updated, thus greatly increasing the effectiveness of performance information generation work.

In addition, in another embodiment, the kiosk 100 may acquire only new performance information that is not stored in the memory of the slave kiosk from the master kiosk.

In addition, in an embodiment, the kiosk 100 may update existing performance information with the detected new performance information (S305).

In addition, in another embodiment, the kiosk 100 may acquire only new performance information from the master kiosk, omit the aforementioned detection stage (S303), and directly update with the acquired new performance information.

Accordingly, since only the information that needs to be modified is acquired and updated, the amount of data transmitted and received between the master kiosk and the slave kiosk is reduced, thus increasing work efficiency and reducing the possibility of errors.

In addition, in an embodiment, the kiosk 100 may provide the cheering stick pairing service based on updated new performance information (S307).

In an embodiment, the kiosk 100 may provide the cheering stick pairing service to which updated new performance information is applied based on a user UI.

Figure 13:
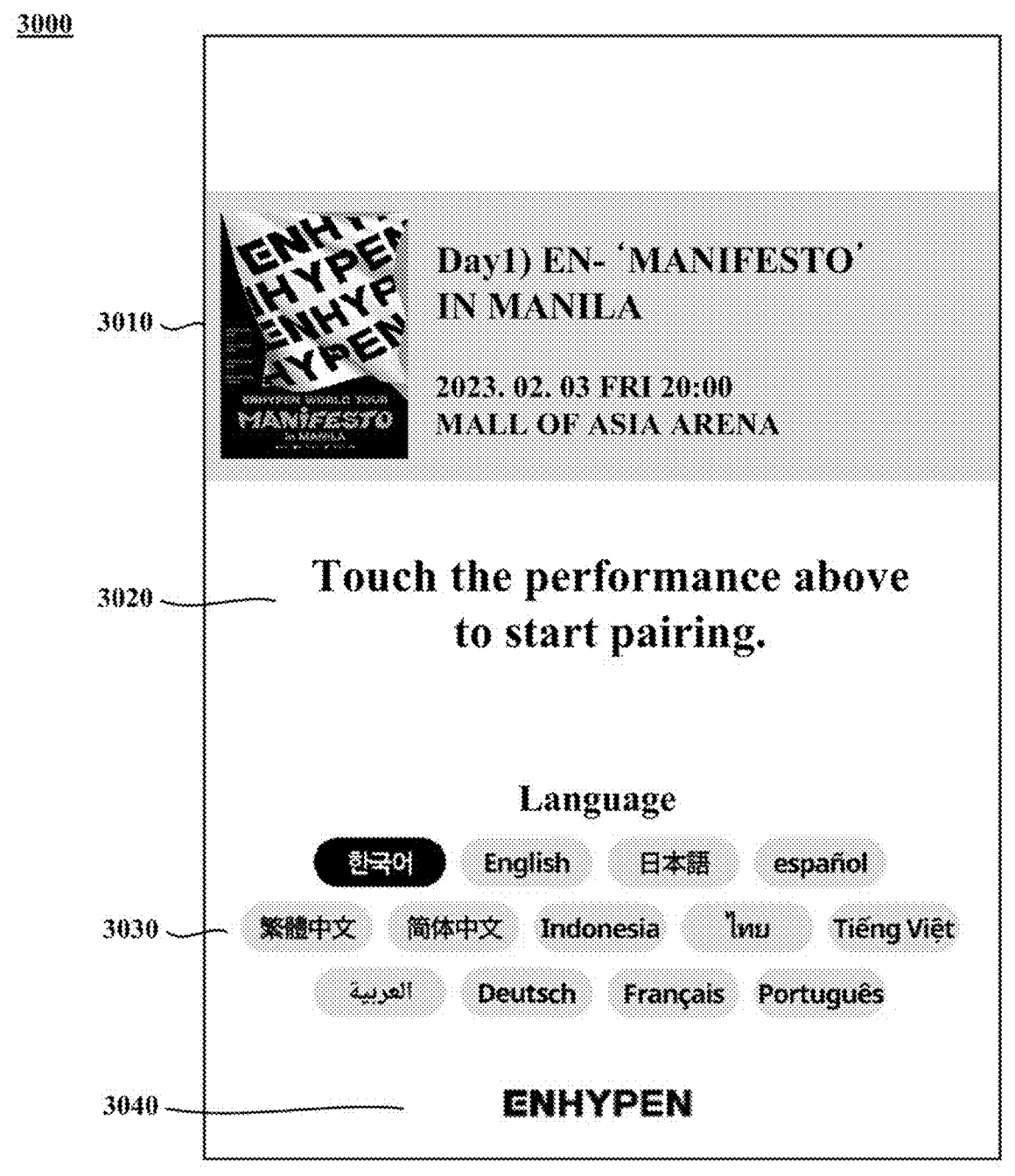

FIG. 13 is a diagram showing an example of a user UI through which a cheering stick pairing service is provided according to an embodiment of the present disclosure. In this connection, the user UI may be output on the display of the slave kiosk where the cheering stick pairing service is provided.

Referring to FIG. 13, in an embodiment, the kiosk 100 may output first to fourth contents 3010, 3020, 3030, and 3040 on the display based on the user UI 3000.

In an embodiment, the first to fourth contents 3010, 3020, 3030, and 3040 may be at least one of an image, video, and/or text. The first to fourth contents 3010, 3020, 3030, and 3040 illustrated are merely examples, and the format, color, size, and output method are not limited to those illustrated.

For example, the first content 3010 may be an image including performance preparation information to which a preset set in the master kiosk is applied.

Accordingly, a user may re-check detailed information about the performance corresponding to the seat library the user wishes to download to his or her cheering stick.

In addition, for example, the second content 3020 may include predetermined text to which a preset set in the master kiosk is applied.

In this connection, the predetermined text may include content necessary for providing the cheering stick pairing service, such as content to notify a user and/or content to induce the user to take action.

In addition, for example, the third content 3030 may be an image including language settings to which a preset set in the master kiosk is applied. In this connection, the third content 3030 may be a button that changes language information and/or presets according to user selection.

In addition, for example, the fourth content 3040 may include a predetermined artist logo image to which a preset set in the master kiosk is applied.

This artist logo image may be continuously exposed on the display while the cheering stick pairing service is provided.

As such, in an embodiment, the kiosk 100 may provide a user (specifically, a fan) with the cheering stick pairing service to which updated new performance information is applied by outputting at least one content included in the user UI.

Accordingly, a user (specifically, a fan) who wishes to download the seat library may pair the cheering stick he or she possesses with the kiosk 100 (in an embodiment, the slave kiosk) based on the provided cheering stick pairing service provided, and may download the seat library that matches a user seat. To this end, in an embodiment, the kiosk 100 may detect the seat library matching the seat in a concert hall where the user will be seated and transmit the same to the paired cheering stick.

In this connection, in an embodiment, the kiosk 100 may generate and store pairing information whenever one cheering stick is paired and transmitting the seat library to the cheering stick is completed (S309).

Herein, the pairing information according to an embodiment may be detailed information about the pairing performed at the corresponding slave kiosk, and may include a speed of pairing per pairing, log information of the pairing, and/or a total number of pairings performed at the kiosk.

In this connection, the log information may be stored at the time of transmitting the seat library from the slave kiosk to the cheering stick, and may include UTC, local time, performance name, artist name, performance date and time, performance location and/or storage date and time.

In addition, the pairing speed and log information of the pairing may be stored each time pairing is performed.

In other words, in an embodiment, the kiosk 100 may generate and store pairing information including detailed information on all pairings performed at the corresponding slave kiosk after the end of the performance when the cheering stick pairing service is terminated.

In addition, in an embodiment, the kiosk 100 may transmit the generated pairing information to the master kiosk (S311).

In this connection, the master kiosk that has received the pairing information may gather the pairing information generated from each of the at least one connected slave kiosk. Herein, the number of generated pairing information may correspond to the number of connected slave kiosks.

In addition, the master kiosk may transmit the gathered pairing information to the performance management server 300.

Accordingly, the performance management server 300, which has received the gathered pairing information from a plurality of master kiosks, may generate pairing statistical information based on the gathered pairing information, and transmit the generated pairing statistical information back to each master kiosk.

In another embodiment, the master kiosk may automatically generate pairing statistical information by gathering pairing information generated from at least one connected slave kiosk.

Thus, according to an embodiment of the present disclosure, the operation (specifically, pairing) status of a plurality of slave kiosks connected to the master kiosk may be identified in real time and immediate response is possible, thereby improving the ability to respond to risks such as device/program failure. In addition, the process of extracting pairing information from each slave kiosk after the end of the performance and manually gathering the same may be omitted, thereby increasing human/resource efficiency.

Hereinbefore, the kiosk setting method and system for a cheering stick pairing service according to an embodiment of the present disclosure provides a central management device capable of integrated control of a plurality of kiosks regardless of the network environment, and thus can utilize the cheering stick pairing service even in areas with poor network environments, thereby resolving regional limitations in terms of performance venue and responding quickly to changes in performance information, and eliminating inconvenience caused by errors and change issues.

In addition, the kiosk setting method and system for a cheering stick pairing service according to an embodiment of the present disclosure monitors the operation status of all connected kiosks in real time, thereby enabling immediate response to stop or encourage the use of kiosks with relatively excessive or too little pairing, and maximizing time and procedural efficiency in providing pairing services by distributing the number of kiosk users.

In addition, the kiosk setting method and system for a cheering stick pairing service according to an embodiment of the present disclosure collects pairing information and generates statistical data, thereby reducing the time, procedural, and human waste required for information collection and providing rapid decision-making support for performances.

The embodiments of the present disclosure described above may be implemented in the form of program commands which may be executed through various types of computer constituting elements and recorded in a computer-readable recording medium. The computer-readable recording medium may include program commands, data files, and data structures separately or in combination thereof. The program commands recorded in the computer-readable recording medium may be those designed and configured specifically for the present disclosure or may be those commonly available for those skilled in the field of computer software. Examples of a computer-readable recoding medium may include magnetic media such as hard-disks, floppy disks, and magnetic tapes; optical media such as CD-ROMs and DVDs; and hardware devices specially designed to store and execute program commands such as ROM, RAM, and flash memory. Examples of program commands include not only machine codes such as those generated by a compiler but also high-level language codes which may be executed by a computer through an interpreter and the like. The hardware device may be replaced with by one or more software modules to perform the operations of the present disclosure, and vice versa.

Specific implementation of the present disclosure are embodiments, which does not limit the technical scope of the present disclosure in any way. For the clarity of the specification, descriptions of conventional electronic structures, control systems, software, and other functional aspects of the systems may be omitted. In addition, connection of lines between constituting elements shown in the figure or connecting members illustrate functional connections and/or physical or circuit connections, which may be replaceable in an actual device or represented by additional, various functional, physical, or circuit connection. In addition, if not explicitly stated otherwise, "essential" or "important" elements may not necessarily refer to constituting elements needed for application of the present disclosure.

In addition, although detailed descriptions of the present disclosure have been given with reference to preferred embodiments of the present disclosure, it should be understood by those skilled in the corresponding technical field or by those having common knowledge in the corresponding technical field that the present disclosure may be modified and changed in various ways without departing from the technical principles and scope specified in the appended claims. Therefore, the technical scope of the present disclosure is not limited to the specifications provided in the detailed descriptions of this document but has to be defined by the appended claims.

What is claimed is:

1. A kiosk setting method for a cheering stick pairing service, the method being performed by a processor of a master kiosk to provide the cheering stick pairing service and comprising:
receiving and storing performance information for at least one performance comprising a first performance;
providing a first kiosk setting interface for providing the cheering stick pairing service;
providing a second kiosk setting interface for providing first performance preparation information for the first performance to a paired cheering stick; and
transmitting the received performance information and setting information set through the first and second kiosk setting interfaces to at least one slave kiosk;
wherein the receiving and storing of the performance information comprises:
recognizing a performance manager device and acquiring performance information previously stored in the performance manager device;
performing real-time communication with a performance management server and the at least one slave kiosk based on a hotspot function when an online connection mode is determined; and
receiving and storing performance preparation information based on at least one of acquiring performance information previously stored in the performance management server when an offline connection mode is determined.

2. The method of claim 1, wherein the providing of the first kiosk setting interface comprises setting performance information comprising at least one of connection server information, device setting information, pop-up information, pairing statistical information, firmware information, preset information, user account information, ticket reservation information, or seat information based on a manager UI.

3. The method of claim 1, wherein the providing of the second kiosk setting interface comprises:
setting at least one of cheering data comprising a performance name, artist name, performance time, performance location, and at least one seat library;
displaying at least one piece of performance preparation information matched to a kiosk ID of a master kiosk in a list; and
setting the first performance preparation information for the first performance based on a predetermined manager input.

4. The method of claim 2, wherein the setting of the pairing statistical information comprises:
collecting pairing information from the at least one slave kiosk;
filtering the pairing information subject to statistics among the collected pairing information; and
generating the pairing statistical information based on the filtered pairing information.

5. The method of claim 1, wherein the transmitting of the setting information set through the first and second kiosk setting interfaces to the at least one slave kiosk comprises at least one of:
transmitting the setting information to the at least one slave kiosk in real time when the online connection mode is determined; and
forming a network with each of the at least one slave kiosk as an AP and transmitting the setting information to the at least one slave kiosk when the offline connection mode is determined.

6. A kiosk setting system for a cheering stick pairing service, the system comprising:
a performance management server;
at least one slave kiosk; and at least one master kiosk comprising a communication processor for data communication with the at least one slave kiosk, a kiosk setting program for setting the slave kiosk, at least one memory for storing at least one piece of performance information, and at least one processor, wherein operations performed by the processor by executing the kiosk setting program comprise:

receiving and storing performance information for at least one performance comprising a first performance;

providing a first kiosk setting interface for providing the cheering stick pairing service;

providing a second kiosk setting interface for providing first performance preparation information for the first performance to a paired cheering stick; and transmitting the received performance information and setting information set through the first and second kiosk setting interfaces to the at least one slave kiosk;

wherein the receiving and storing of the performance information comprises:

recognizing a performance manager device and acquiring performance information previously stored in the performance manager device;

performing real-time communication with the performance management server and the at least one slave kiosk based on a hotspot function when an online connection mode is determined; and receiving and storing performance preparation information based on at least one of acquiring performance information previously stored in the performance management server when an offline connection mode is determined.

7. The system of claim 6, wherein the providing of the first kiosk setting interface comprises setting performance information comprising at least one of connection server information, device setting information, pop-up information, pairing statistical information, firmware information, preset information, user account information, ticket reservation information, or seat information based on a manager UI.

8. The system of claim 7, wherein the providing of the second kiosk setting interface comprises:

setting at least one of cheering data comprising a performance name, artist name, performance time, performance location, and at least one seat library;

displaying at least one piece of performance preparation information matched to a kiosk ID of the master kiosk in a list; and setting the first performance preparation information for the first performance based on a predetermined manager input.

9. The system of claim 8, wherein the setting of the pairing statistical information comprises:

collecting pairing information from the at least one slave kiosk;

filtering the pairing information subject to statistics among the collected pairing information; and generating the pairing statistical information based on the filtered pairing information.

* * * * *